United States Patent
Ishikawa et al.

(10) Patent No.: US 9,779,906 B2
(45) Date of Patent: Oct. 3, 2017

(54) ELECTRON EMISSION DEVICE AND TRANSISTOR PROVIDED WITH THE SAME

(71) Applicant: KABUSHIKI KAISHA TOYOTA CHUO KENKYUSHO, Nagakute-shi, Aichi-ken (JP)

(72) Inventors: Tsuyoshi Ishikawa, Nagakute (JP); Takashi Katsuno, Nagakute (JP); Narumasa Soejima, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 15/503,539

(22) PCT Filed: Oct. 2, 2015

(86) PCT No.: PCT/JP2015/078115
§ 371 (c)(1),
(2) Date: Feb. 13, 2017

(87) PCT Pub. No.: WO2016/080091
PCT Pub. Date: May 26, 2016

(65) Prior Publication Data
US 2017/0243712 A1    Aug. 24, 2017

(30) Foreign Application Priority Data

Nov. 19, 2014  (JP) .................................. 2014-234782

(51) Int. Cl.
*H01J 29/48*    (2006.01)
*H01J 1/30*     (2006.01)
(Continued)

(52) U.S. Cl.
CPC .......... *H01J 29/481* (2013.01); *H01J 1/3046* (2013.01); *H01J 1/34* (2013.01); *H01J 1/35* (2013.01); *H01S 3/1636* (2013.01)

(58) Field of Classification Search
CPC .... H01J 1/34; H01J 1/35; H01J 1/3046; H01J 29/481; H01S 3/1636
See application file for complete search history.

(56) References Cited

U.S. PATENT DOCUMENTS 4,063,269 A * 12/1977  Hara .......................... H01J 1/34
                                                            257/11
4,094,703 A    6/1978   Williams
(Continued)

FOREIGN PATENT DOCUMENTS

AU       1306070 A       9/1971
JP       S47-011147 Y1   4/1972
(Continued)

OTHER PUBLICATIONS

Peter Hommelhoff et al., "Field Emission Tip as a Nanometer Source of Free Electron Femtosecond Pulses," Physical Review Letters, vol. 96, pp. 077401-1 to 077401-4, (2006).
(Continued)

*Primary Examiner* — Evan Pert
(74) *Attorney, Agent, or Firm* — Oliff PLC

(57) ABSTRACT

An electron emission device includes a substrate and an electron emission layer. The electron emission layer is provided above the substrate, and is provided with an opening. The electron emission layer has an edge defining the opening and is configured to emit electrons from the edge when the edge is irradiated with light.

15 Claims, 22 Drawing Sheets

(51) Int. Cl.
H01J 1/34 (2006.01)
H01J 1/35 (2006.01)
H01J 1/304 (2006.01)
H01S 3/16 (2006.01)

(56) References Cited

U.S. PATENT DOCUMENTS

| | | | |
|---|---|---|---|
| 4,616,248 A | | 10/1986 | Khan et al. |
| 4,906,894 A * | | 3/1990 | Miyawaki ............ H01J 1/34 257/10 |
| 5,552,659 A * | | 9/1996 | Macaulay ............ H01J 3/022 313/309 |
| 5,616,061 A * | | 4/1997 | Potter ............ H01J 9/025 313/496 |
| 5,618,216 A * | | 4/1997 | Potter ............ H01J 3/022 445/24 |
| 6,135,839 A | | 10/2000 | Iwase et al. |
| 6,522,053 B1 | | 2/2003 | Iwase et al. |
| 7,528,539 B2 * | | 5/2009 | Ohwada ............ B82Y 10/00 313/311 |
| 7,683,531 B2 * | | 3/2010 | Lin ............ H01J 31/127 313/310 |
| 2003/0151352 A1 | | 8/2003 | Yamaguchi |
| 2005/0242706 A1 * | | 11/2005 | Kim ............ H01J 1/304 313/497 |
| 2008/0042563 A1 | | 2/2008 | Niigaki et al. |
| 2010/0148667 A1 | | 6/2010 | Niigaki et al. |

FOREIGN PATENT DOCUMENTS

| | | |
|---|---|---|
| JP | S48-012665 B1 | 4/1973 |
| JP | S53-084694 A | 7/1978 |
| JP | S61-267374 A | 11/1986 |
| JP | H10-289650 A | 10/1998 |
| JP | 2002-500817 A | 1/2002 |
| JP | 2003-208855 A | 7/2003 |
| JP | 2008-016294 A | 1/2008 |
| JP | 2008-288099 A | 11/2008 |
| JP | 2010-257898 A | 11/2010 |
| WO | 99/50874 A2 | 10/1999 |

OTHER PUBLICATIONS

Anna Mustonen et al., "Efficient Light Coupling for Optically Excited High-Density Metallic Nanotip Arrays," Scientific Reports, vol. 2, pp. 1-5, (2012).

Oct. 27, 2015 Search Report issued in International Patent Application No. PCT/JP2015/078115.

Oct. 27, 2015 Written Opinion issued in International Patent Application No. PCT/JP2015/078115.

Dec. 20, 2016 Office Action issued in Japanese Patent Application No. 2014-234782.

* cited by examiner

ELECTRON EMISSION DEVICE AND TRANSISTOR PROVIDED WITH THE SAME

TECHNICAL FIELD

The technique disclosed herein relates to an electron emission device. Further, the technique disclosed herein relates also to a transistor provided with the electron emission device.

BACKGROUND ART

Japanese Patent Application Publication No. 2010-257898, Peter Hommelhoff, Yvan Sortais, Anoush Aghajani-Talesh, and Mark A. Kasevich, Physical Review Letters 96, 077401 (2006), and Anna Mustonen, Paul Beaud, Eugenie Kirk, Thomas Fetzer, and Soichiro Tsujino, Scientific Reports 2, p. 915 (2012) disclose photoinductive electron emission devices. These electron emission devices are each provided with an electron emission source and a laser beam irradiator. The electron emission source is provided with an acute conical metal. In such electron emission devices, when laser beam is irradiated from the laser beam irradiator to a tip of the conical metal, an optical electric field is applied to the tip of the conical metal, and electrons are emitted from the tip of the conical metal due to its tunneling effect.

SUMMARY OF INVENTION

Technical Problem

A conical metal used as the electron emission source is fabricated by processing metal wires. In order to improve electron emission efficiency, it is preferable to reduce a curvature radius at a tip of the conical metal. However, processing metal wires in such a shape with high accuracy is technically difficult. The description herein aims to provide a photoinductive electron emission device of which fabrication is easy. The description herein further aims to provide a transistor provided with the photoinductive electron emission device of which fabrication is easy.

Solution to Technical Problem

In an embodiment, an electron emission device disclosed herein comprises a substrate and an electron emission layer. The electron emission layer is disposed above the substrate. An opening is arranged in the electron emission layer. The electron emission layer has an edge defining the opening and is configured to emit electrons from the edge when the edge is irradiated with light. The electron emission device can emit electrons from its edge when the light is irradiated to the edge defining the opening of the electron emission layer and an optical electric field is applied. The electron emission device uses the electron emission layer as an electron emission source, and allows the edge defining the opening of the electron emission layer to function as an electron emitting region. Such an electron emitting region can easily be obtained by providing an opening in the electron emission layer. Due to this, this electron emission device can be evaluated as having a structure of which fabrication is easy.

In an embodiment, a transistor disclosed herein comprises a substrate, a cathode layer, and an anode layer. The cathode layer is disposed above the substrate. An opening is arranged in the cathode layer. The anode layer is disposed above the cathode layer. The cathode layer has an edge defining the opening and is configured to emit electrons from the edge when the edge is irradiated with light. The transistor can emit electrons from its edge when the light is irradiated to the edge defining the opening of the cathode layer and an optical electric field is applied. The electrons emitted from the cathode layer flows into the anode layer. As above, this transistor can control current flowing between the cathode layer and the anode layer based on the light irradiation. The transistor uses the cathode layer as an electron emission source, and allows the edge defining the opening of the cathode layer to function as an electron emitting region. Such an electron emitting region can easily be obtained by providing an opening in the cathode layer. Due to this, this transistor can be evaluated as having a structure of which fabrication is easy.

DESCRIPTION OF EMBODIMENTS

Figure 1:
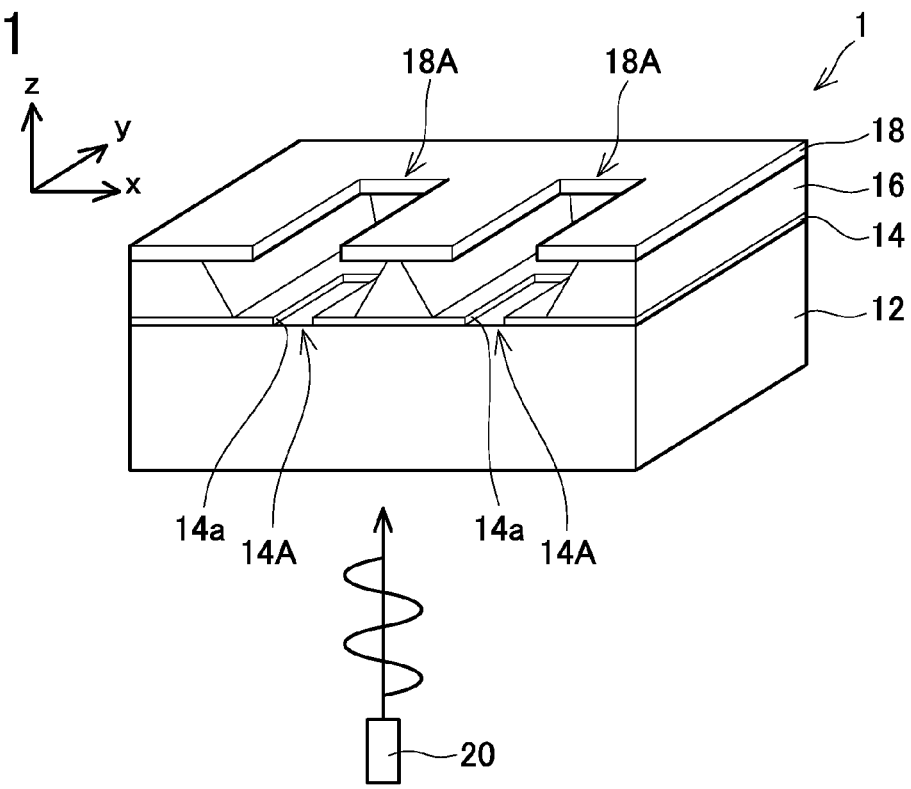
FIG. 1 schematically shows a perspective view of a primary portion of an electron emission device of a first embodiment.

Some of the features characteristic disclosed herein will be listed. It should be noted that the respective technical elements are independent of one another, and each has a technical utility.

An embodiment of the electron emission device disclosed herein may for example be configured as a field emission array. As a purpose of such an electron emission device, for example, a transistor, an electron beam lithography device, or electronic display device may be exemplified. An embodiment of the electron emission device may at least be provided with a substrate and an electron emission layer. A material of the substrate is not particularly limited, however, it is preferably semiconductor or insulator. The electron emission layer is provided above the substrate, and is provided with an opening. The electron emission layer may be provided above the substrate so as to directly contact an upper surface of the substrate, or may be provided above the substrate via another member. The electron emission layer may be provided with a single opening or a plurality of openings. A shape of the opening of the electron emission layer is not particularly limited, and various types of shapes may be employed. Further, if plural openings are provided in the electron emission layer, the plural openings may be arranged in a stripe pattern, or may be arranged in a lattice pattern configured of plural rows and columns. The electron emission layer is utilized as an electron emission source, and it preferably is made of a material containing free electrons. The material of the electron emission layer may be a single substance of transition metal such as molybdenum or tungsten, or a composition of transition metals. Alternatively, the material of the electron emission layer may be metals such as gold, silver, copper, aluminum, or platinum. Alternatively, the material of the electron emission layer may be alkaline earth metal oxides containing barium. Alternatively, the material of the electron emission layer may be diamond or graphite. The electron emission layer is configured to emit the electrons from its edge when the light is irradiated onto the edge defining its opening. Due to this, the electron emission layer is preferably a flat thin layer.

In an embodiment, the electron emission device disclosed herein may further comprise a light irradiator. The light irradiator is configured to irradiate light toward the electron emission layer. Types of the light irradiator are not particularly limited, however, a semiconductor laser, a solid laser, or a gas laser may be employed as the light irradiator. The electron emission device of this type of embodiment can control electron emission from the electron emission layer based on the light irradiation from the light irradiator.

The opening of the electron emission layer may include a shape extending in a longitudinal direction when seen along a direction orthogonal to an upper surface of the substrate. In this case, preferably the light irradiator is configured to irradiate a laser beam of linearly polarized light of which oscillation plane of electric field is orthogonal to the longitudinal direction. Here, laser beam of the linearly polarized light may be continuous oscillating laser, or may be pulsed oscillating laser. The electron emission device of this type of embodiment efficiently applies an optical electric field at the edge extending along the longitudinal direction within the edge defining the opening of the electron emission layer, which results in promoting electric field concentration. As a result, the electron emission device of this type of embodiment has a characteristic in having a high efficiency of electric field election emission.

A material of the substrate may be transparent to the light of the light irradiator. Specifically, the material of the substrate preferably has at least 80% or more transmittance of the light of the light irradiator. In this case, the light irradiator is preferably configured to allow the light to pass through the substrate and be irradiated to the electron emission layer. In the electron emission device of this type of embodiment, the light from the light irradiator passes through the transparent substrate and is irradiated onto the electron emission layer, so the light from the light irradiator is efficiently irradiated onto the electron emission layer. As a result, the electron emission device of this type of embodiment can have a characteristic in having a high efficiency of electric field election emission.

In an embodiment, the electron emission device may further comprise an extraction electrode. The extraction electrode is disposed above the electron emission layer, and an opening is arranged in the extraction electrode. The opening of the extraction electrode is located above the opening of the electron emission layer. When such an extraction electrode is provided, the electric field intensity of the edge defining the opening of the electron emission layer can be made high as needed when applying a voltage between the electron emission layer and the extraction electrode. The electron emission device of this type of embodiment can perform field electron emission when the field electron emission cannot be carried out only by the optical electric field generated by the light irradiation, by applying a voltage between the electron emission layer and the extraction electrode.

Preferably, the edge defining the opening of the electron emission layer is within the opening of the extraction electrode when seen along the direction orthogonal to the upper surface of the substrate. When the opening of the electron emission layer and the opening of the extraction electrode are arranged in such a positional relationship, the electrons emitted from the edge defining the opening of the electron emission layer pass efficiently through the opening of the extraction electrode, and are drawn out above the extraction electrode.

In an embodiment of the electron emission device comprising the extraction electrode, the substrate may comprise a convex. In this case, preferably a part of a side surface of the convex is covered with the electron emission layer. Further, preferably a top surface of the convex is exposed through the opening of the electron emission layer. In the electron emission device of this type of embodiment, the electric field intensity of the edge defining the opening of the electron emission layer becomes high even when the voltage applied between the electron emission layer and the extraction electrode is low. Due to this, the electron emission device of this type of embodiment can perform the field electron emission even when the voltage applied between the electron emission layer and the extraction electrode is low.

In an embodiment, the transistor disclosed herein may comprise at least a substrate, a cathode layer, and an anode layer. The material of the substrate is not particularly limited, however, it is preferably semiconductor or insulator. The cathode layer is provided above the substrate, and is provided with an opening. The cathode layer may be provided above the substrate so as to directly contact the upper surface of the substrate, or may be provided above the substrate via another member. The cathode layer may be provided with a single opening or a plurality of openings. A shape of the opening of the cathode layer is not particularly limited. Further, if plural openings are provided in the cathode layer, the plural openings may be arranged in a stripe pattern, or may be arranged in a lattice pattern configured of plural rows and columns. The cathode layer is utilized as the electron emission source, and it preferably is made of a material containing free electrons. The material of the cathode layer may be a single substance of transition metal such as molybdenum or tungsten, or a composition of transition metals. Alternatively, the material of the cathode layer may be metals such as gold, silver, copper, aluminum, tungsten, or platinum. Alternatively, the material of the cathode layer may be alkaline earth metal oxides containing barium. Alternatively, the material of the cathode layer may be diamond or graphite. An anode layer is provided above the cathode layer. The cathode layer is configured to emit the electrons from its edge when the light is irradiated onto the edge defining its opening. Due to this, the cathode layer is preferably a flat thin layer.

In an embodiment, the transistor disclosed herein may further comprise a light irradiator. The light irradiator is configured to irradiate light toward the cathode layer. Types of the light irradiator are not particularly limited, however, a semiconductor laser, a solid laser, or a gas laser may be employed as the light irradiator. The transistor of this type of embodiment can control current flowing between the cathode layer and the anode layer based on the light irradiation from the light irradiator.

The opening of the cathode layer may have a shape extending along a longitudinal direction when seen along a direction orthogonal to an upper surface of the substrate. In this case, preferably the light irradiator is configured to irradiate a laser beam of linearly polarized light of which oscillation plane of electric field is orthogonal to the longitudinal direction. Here, laser beam of the linearly polarized light may be continuous oscillating laser, or may be pulsed oscillating laser. The transistor of this type of embodiment efficiently applies an optical electric field at the edge extending along the longitudinal direction within the edge defining the opening of the cathode layer, which results in promoting electric field concentration. As a result, the transistor of this type of embodiment has a characteristic in having a high efficiency of electric field election emission.

A material of the substrate may be transparent to the light of the light irradiator. Specifically, the material of the substrate preferably has at least 80% transmittance of the light of the light irradiator. In this case, preferably the light irradiator is configured to irradiate the light toward the cathode layer through the substrate. In the transistor of this type of embodiment, the light from the light irradiator passes through the transparent substrate and is irradiated onto the cathode layer, so the light from the light irradiator is efficiently irradiated onto the cathode layer. As a result, the transistor of this type of embodiment can have a characteristic in having a high efficiency of electric field election emission.

In an embodiment, the transistor disclosed herein may further comprise an extraction electrode disposed between the cathode layer and the anode layer. An opening of the extraction electrode is located above the opening of the cathode layer. When such an extraction electrode is provided, the electric field intensity of the edge defining the opening of the cathode layer can be made high as needed by applying a voltage between the cathode layer and the extraction electrode. The transistor of this type of embodiment can perform field electron emission when the field electron emission cannot be carried out only by the optical electric field generated by the light irradiation, by applying a voltage between the cathode layer and the extraction electrode.

Preferably, the edge defining the opening of the cathode layer is within the opening of the extraction electrode when seen along the direction orthogonal to the upper surface of the substrate. When the opening of the cathode layer and the opening of the extraction electrode are arranged in such a positional relationship, the electrons emitted from the edge defining the opening of the cathode layer pass efficiently through the opening of the extraction electrode, and are drawn out above the extraction electrode.

In an embodiment of the transistor comprising the extraction electrode, the substrate may comprise a convex. In this case, preferably a part of a side surface of the convex is covered with the cathode layer. Further, preferably a top surface of the convex is exposed through the opening of the cathode layer. In the transistor of this type of embodiment, the electric field intensity of the edge defining the opening of the cathode layer becomes high even when the voltage applied between the cathode layer and the extraction electrode is low. Due to this, the transistor of this type of embodiment can perform the field electron emission even when the voltage applied between the cathode layer and the extraction electrode is low.

First Embodiment

As shown in FIG. 1, an electron emission device 1 is a device for emitting electrons in vacuo, and is configured as a field emission array. The electron emission device 1 comprises a substrate 12, an electron emission layer 14, an insulating film 16, an extraction electrode 18, and a laser beam irradiator 20.

The substrate 12 is made of a material that is transparent to laser beam irradiated from the laser beam irradiator 20. As will be described later, in this example, a wavelength range of the laser beam to be irradiated from the laser beam irradiator 20 is an infrared to near-infrared range. Due to this, in this example, a silicon carbide (SiC)-based or gallium nitride (GaN)-based wide band gap semiconductor, sapphire, or magnesium oxide is used as the material of the substrate 12.

The electron emission layer 14 covers a part of an upper surface of the substrate 12, and is in direct contact with the upper surface of the substrate 12. The electron emission layer 14 is a flat thin layer. The electron emission layer 14 is used as an electron emission source. Due to this, a material containing free electrons is preferably used for the electron emission layer 14. In this example, tungsten is used as the material of the electron emission layer 14.

Figure 2:
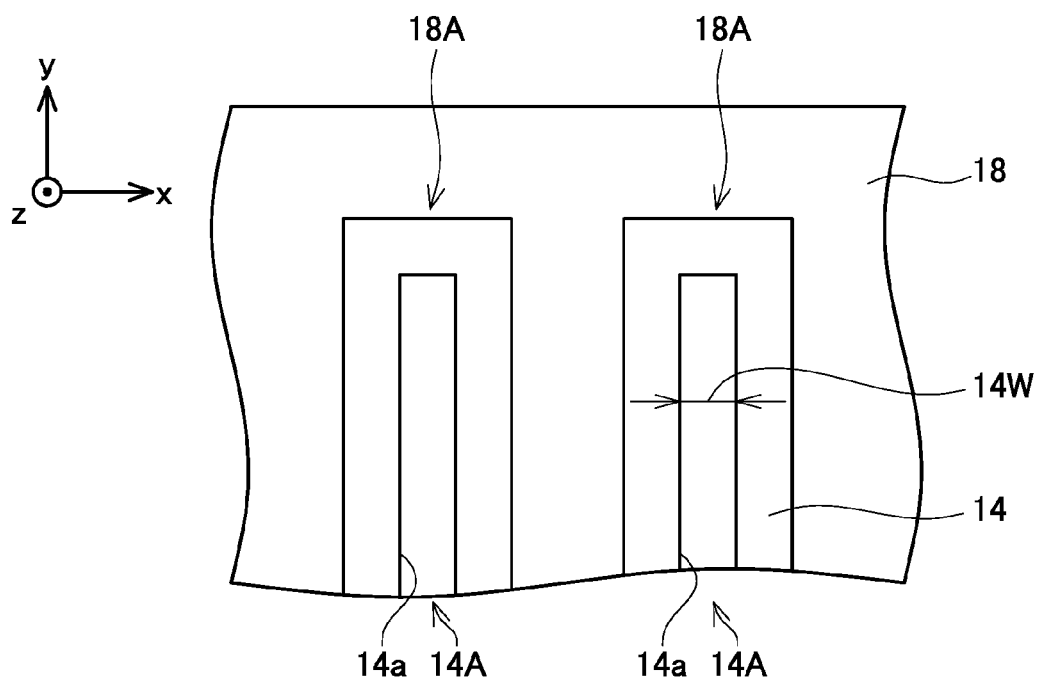
FIG. 2 schematically shows a plan view of the primary portion of the electron emission device of the first embodiment.

The electron emission layer 14 is provided with plural openings 14A. As shown in FIG. 2, each of the plural openings 14A of the electron emission layer 14 has a rectangular shape that extends with its longitudinal direction along a y-axis direction when seen along a direction orthogonal to the upper surface of the substrate 12 (hereinbelow referred to as a z-axis direction). Furthermore, the plural openings 14A of the electron emission layer 14 are arranged in a stripe pattern on the upper surface of the substrate 12 by being aligned at regular intervals along an x-axis direction. Notably, FIGS. 1 and 2 depict one primary portion of the electron emission device 1, and in reality a greater number of openings 14A are aligned along the x-axis direction.

The insulating film 16 is provided between the electron emission layer 14 and the extraction electrode 18, and is in direct contact with each of the electron emission layer 14 and the extraction electrode 18. The insulating film 16 electrically insulates the electron emission layer 14 from the extraction electrode 18. In this example, silicon oxide ($SiO_2$) is used as a material of the insulating film 16.

The extraction electrode 18 covers an upper surface of the insulating film 16, and is in direct contact with the upper surface of the insulating film 16. As will be described later, the extraction electrode 18 is used by having a positive voltage applied thereto so that a potential difference is generated with the electron emission layer 14. Due to this, the extraction electrode 18 is preferably a conductor, more specifically, metal. In this example, molybdenum is used as a material of the extraction electrode 18.

The extraction electrode 18 is provided with plural openings 18A. The plural openings 18A of the extraction electrode 18 are provided along the z-axis direction corresponding to the plural openings 14A of the electron emission layer 14. The openings 18A of the extraction electrode 18 and the openings 14A of the electron emission layer 14 are arranged so as to have corresponding pairs thereof communicate through spaces formed in the insulating film 16. As shown in FIG. 2, each of the plural openings 18A of the extraction electrode 18 has a rectangular shape that extends with its longitudinal direction along the y-axis direction when seen along the z-axis direction, is a similar figure of its corresponding opening 14A of the electron emission layer 14, and is larger than its corresponding opening 14A of the electron emission layer 14. Due to this, an edge 14a defining each opening 14A of the electron emission layer 14 is located within its corresponding opening 18A of the extraction electrode 18 when seen along the z-axis direction.

The laser beam irradiator 20 is arranged to face against a lower surface of the substrate 12, and is configured to irradiate laser beam to the electron emission layer 14 by permeating the laser beam through the substrate 12. In this example, a Ti-sapphire laser is used as the laser beam irradiator 20. Due to this, the laser beam irradiator 20 irradiates laser beam with a wavelength of about 650 nm to 1100 nm, which is within an infrared to near-infrared range. Further, the laser beam irradiator 20 is configured so that the irradiated laser beam becomes p-polarized light for the electron emission layer 14. In this example, the laser beam irradiator 20 is configured so that an oscillation plane of electric field of the irradiated laser beam spreads along an xz plane. Due to this, the oscillation plane of electric field of the laser beam is positionally orthogonal to the longitudinal direction (y-axis direction) of the openings 14A of the electron emission layer 14.

Next, an operation of the electron emission device 1 will be described. Firstly, a voltage is applied between the electron emission layer 14 and the extraction electrode 18 so that the extraction electrode 18 comes to be at a positive potential relative to the electron emission layer 14. Due to this, an electric field intensity at the edges 14a defining the openings 14A of the electron emission layer 14 becomes high. At this occasion, the voltage applied between the electron emission layer 14 and the extraction electrode 18 is set so that the electric field intensity at the edges 14a of the electron emission layer 14 becomes $10^7$ V/cm or lower.

The electron emission device 1 controls the electron emission from the electron emission layer 14 using laser beam from the laser beam irradiator 20. When the laser beam from the laser beam irradiator 20 is not irradiated to the electron emission layer 14, the electric field intensity at the edges 14a of the electron emission layer 14 is $10^7$ V/cm or lower as described above, and thus the electrons are not emitted from the electron emission layer 14. On the other hand, when the laser beam from the laser beam irradiator 20 is irradiated to the electron emission layer 14, an optical electric field is superposed on the edges 14a of the electron emission layer 14, and the electric field intensity at the edges 14a of the electron emission layer 14 becomes high. Furthermore, Plasmon resonance is generated at the edges 14a of the electron emission layer 14, and the electric field intensity at the edges 14a of the electron emission layer 14 becomes high. When the laser beam from the laser beam irradiator 20 is irradiated to the electron emission layer 14, the electric field intensity at the edges 14a of the electron emission layer 14 rises to a value that is sufficient for field electron emission by the aforementioned phenomena. As a result, the electrons existing in the electron emission layer 14 pass through a vacuum bather by a quantum-mechanical tunnel effect, and are emitted in vacuo from the edges 14a of the electron emission layer 14. The electrons emitted from the electron emission layer 14 pass through the openings 18A of the extraction electrode 18, and are drawn out into a space above the extraction electrode 18.

As described above, the electron emission device 1 operates to perform the electron emission from the edges 14a of the electron emission layer 14 when the laser beam from the laser beam irradiator 20 is irradiated to the electron emission layer 14, and to stop the electron emission from the edges 14a of the electron emission layer 14 when the laser beam from the laser beam irradiator 20 is not irradiated to the electron emission layer 14. Since the electron emission device 1 can control the field electron emission using the laser beam from the laser beam irradiator 20, it has characteristics of being robust to electric noise and capable of operating at fast speed. Further, the only voltage applied to the electron emission device 1 is in between the electron emission layer 14 and the extraction electrode 18, where insulation is ensured by the insulating film 16. The electron emission device 1 can ensure insulation with a simple configuration, thus it also has a characteristic of high reliability.

In the electron emission device 1, the edges 14a defining the openings 14A of the electron emission layer 14 function as electron emitting regions. Due to this, a curvature radius of the edges 14a of the electron emission layer 14 becomes smaller with thinner electron emission layer 14, and electric field concentration at the edges 14a of the electron emission layer 14 can be promoted. If the curvature radius of the edges 14a of the electron emission layer 14 is small, the electrons can efficiently be emitted by the irradiation of the laser beam from the laser beam irradiator 20. The electron emission device 1 can adjust the curvature radius of the edges 14a of the electron emission layer 14 functioning as the electron emitting regions simply by adjusting a thickness of the electron emission layer 14. As above, the electron emission device 1 can configure highly efficient electron emitting regions by a simple process of forming the openings 14A in the electron emission layer 14. The electron emission device 1 has a characteristic of having a structure that can easily be fabricated. Notably, the thickness of the edges 14a of the electron emission layer 14 simply needs to be a thickness with which the field electron emission can be performed, so it is suitably adjusted according to required performances. In an example, the thickness of the edges 14a of the electron emission layer 14 is preferably about 10 to 100 nm. Further, in order to reduce the thickness of the edges 14a of the electron emission layer 14, a thickness of the entire electron emission layer 14 may be thinned, or alternatively, only the edges 14a of the electron emission layer 14 may be thinned as needed, and other portions may remain thick.

As described above, the electron emission device 1 is configured so that the laser beam from the laser beam irradiator 20 passes through the substrate 12 and is irradiated to the electron emission layer 14. Due to this, the laser beam from the laser beam irradiator 20 can efficiently be irradiated to the electron emission layer 14 without being hindered by other members.

In the electron emission device 1, the laser beam irradiated from the laser beam irradiator 20 is light p-polarized relative to the electron emission layer 14, and an oscillation plane of electric field of the laser beam is positionally orthogonal to the longitudinal direction (y-axis direction) of the openings 14A of the electron emission layer 14. Due to this, the optical electric field generated by the laser beam irradiated from the laser beam irradiator 20 is efficiently superposed on each pair of edges 14a extending along the y-axis direction within the edges 14a defining the openings 14A of the electron emission layer 14. In the electron emission device 1, since the openings 14A of the electron emission layer 14 have the rectangular shape having the longitudinal direction along the y-axis direction, each pair of edges 14a extending in the y-axis direction is formed in an elongated shape. Due to this, the electron emission device 1 can perform the field electron emission at the elongated pairs of edges 14a, so the field electron emission can be performed at high efficiency.

Further, in order to further improve the efficiency of the field electron emission, as shown in FIG. 2, a distance between each pair of edges 14a defining each of the openings 14A of the electron emission layer 14 (hereinbelow referred to as an opening width 14W of the electron emission layer 14) is preferably made short relative to a wavelength of the laser beam from the laser beam irradiator 20. In this example, the opening width 14W of the electron emission layer 14 is preferably about 300 to 1000 nm. If the opening width 14W of the electron emission layer 14 is shorter than the wavelength of the laser beam from the laser beam irradiator 20, the laser beam can be suppressed from reaching beyond the electron emission layer 14 and into the extraction electrode 18, and heat generation in the extraction electrode 18 can be suppressed. Furthermore, if the opening width 14W of the electron emission layer 14 is short, the electron emission device 1 can perform the field electron emission highly efficiently due to the edges 14a of the electron emission layer 14 functioning as the electron emitting regions being arranged at a high density.

Further, in the electron emission device 1, the electron emission layer 14 makes direct contact with the upper surface of the substrate 12. In such an embodiment, the substrate 12 is preferably a semi-insulative material. For example, the material of the substrate 12 is preferably a wide band gap semiconductor with high resistance, such as silicon carbide or gallium nitride. In this case, equipotential lines formed by the voltage applied between the electron emission layer 14 and the extraction electrode 18 are bent so as to pass through the openings 14A of the electron emission layer 14 and enter into the substrate 12. As above, so long as the substrate material has a dielectric constant greater than 1, the equipotential lines pass through the openings 14A of the electron emission layer 14 and bend deeply into the substrate 12 as compared to a case where the underneath the electron emission layer 14 is in vacuo. Due to this, the electric field concentration at the edges 14a defining the openings 14A of the electron emission layer 14 is enhanced, and the efficiency of the field electron emission is improved.

Figure 3:
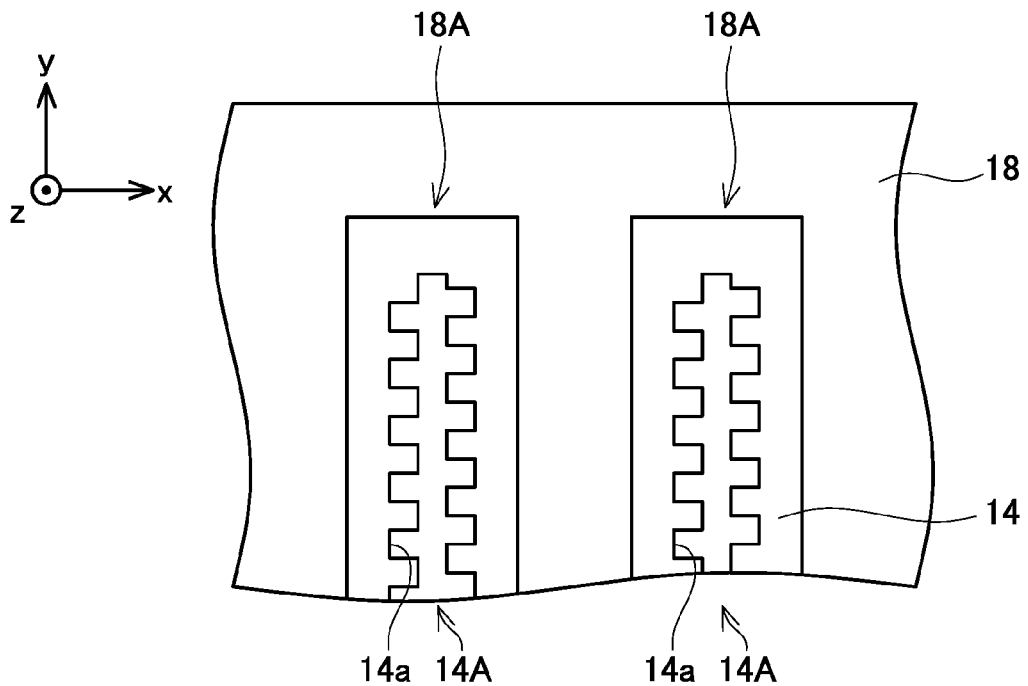
FIG. 3 schematically shows a plan view of a primary portion of an electron emission device of a variant of the first embodiment.
Figure 4:
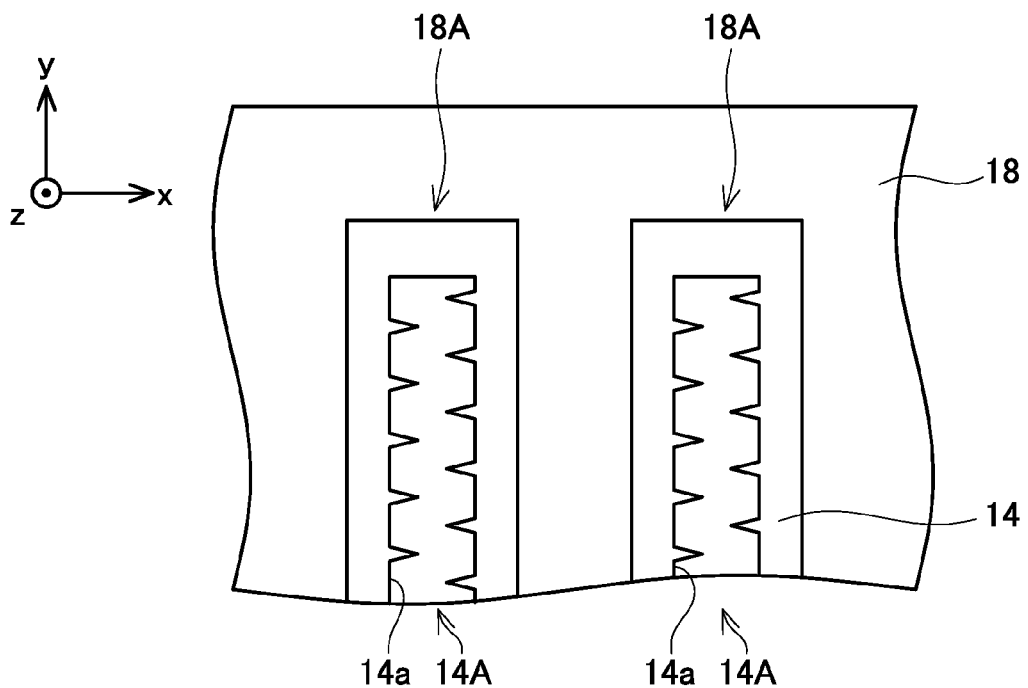
FIG. 4 schematically shows a plan view of a primary portion of an electron emission device of a variant of the first embodiment.

As shown in FIG. 3, when seen along the z-axis direction, the shape of the openings 14A of the electron emission layer 14 may include plural right-angle corners on each pair of edges 14a extending in the y-axis direction. Alternatively, as shown in FIG. 4 and seen along the z-axis direction, the shape of the openings 14A of the electron emission layer 14 may include plural acute-angle portions on each pair of edges 14a extending in the y-axis direction. Such right-angle or acute-angle portions allow the curvature radius to further be decreased, resulting in further enhanced electric field concentration, and the efficiency of the field electron emission is further improved.

Figure 5A:
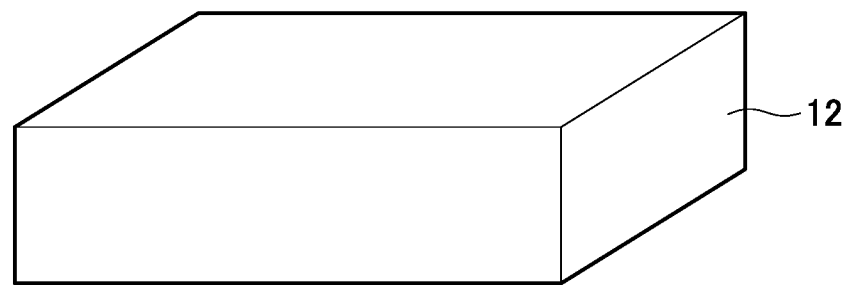
FIG. 5A shows a step of an electron emission device manufacturing process of the first embodiment.

Next, a method of manufacturing the electron emission device 1 will be described with reference to FIGS. 5A to 5F. Firstly, as shown in FIG. 5A, the substrate 12 is prepared.

Figure 5B:
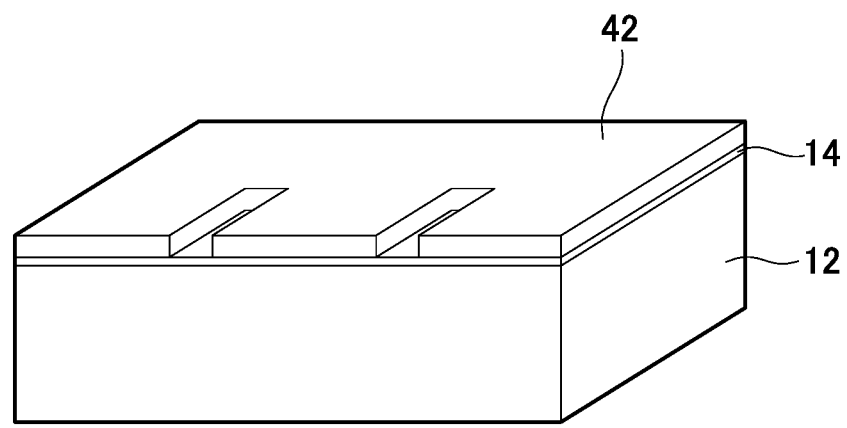
FIG. 5B shows a step of the electron emission device manufacturing process of the first embodiment.

Next, as shown in FIG. 5B, the electron emission layer 14 is deposited on the upper surface of the substrate 12 using vapor deposition technique. Then, a photo mask 42 is patterned on an upper surface of the electron emission layer 14 by using photolithography technique. The photo mask 42 is patterned so that regions corresponding to positions of openings to be formed on the electron emission layer 14 are removed.

Figure 5C:
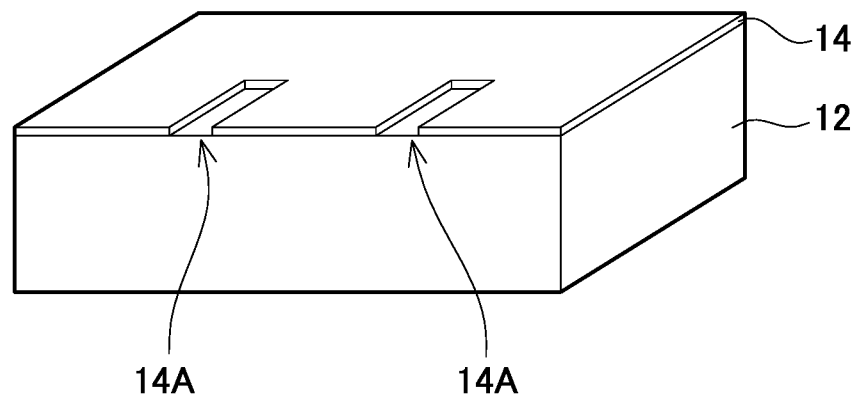
FIG. 5C shows a step of the electron emission device manufacturing process of the first embodiment.

Next, as shown in FIG. 5C, portions of the electron emission layer 14 exposed in the openings of the photo mask 42 are removed using dry etching technique or wet etching technique to form the openings 14A, and portions of the upper surface of the substrate 12 are exposed. Thereafter, the photo mask 42 is removed.

Figure 5D:
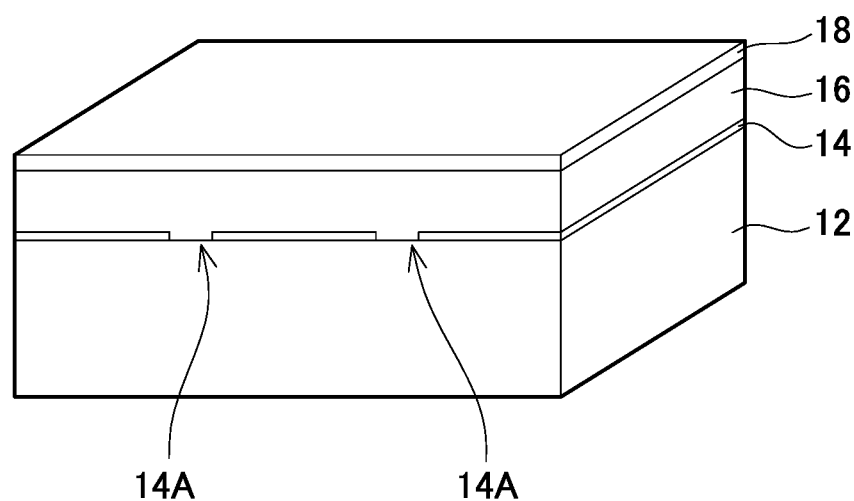
FIG. 5D shows a step of the electron emission device manufacturing process of the first embodiment.

Next, as shown in FIG. 5D, the insulating film 16 is deposited on an upper surface of the electron emission layer 14 using CVD technique. Then, the extraction electrode 18 is deposited on an upper surface of the insulating film 16 using vapor deposition technique.

Figure 5E:
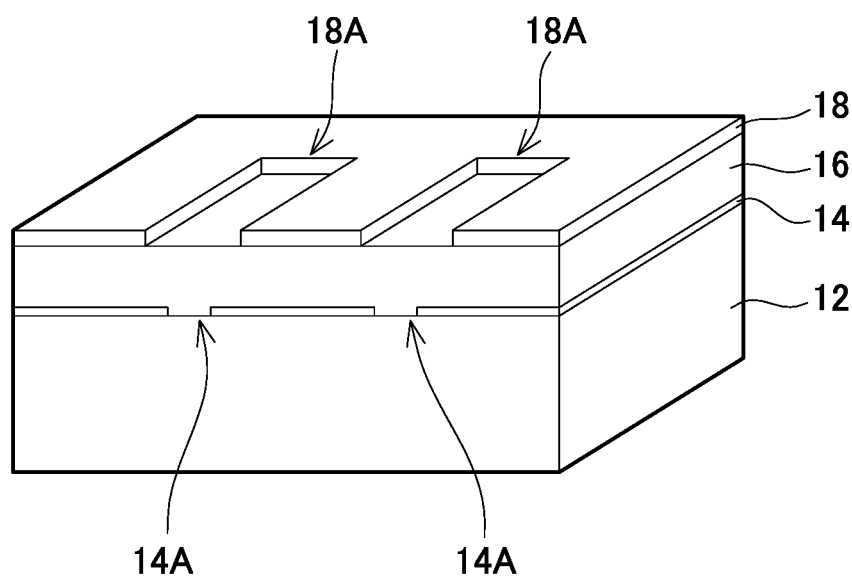
FIG. 5E shows a step of the electron emission device manufacturing process of the first embodiment.

Next, as shown in FIG. 5E, portions of the extraction electrode 18 are removed using photolithography technique and etching technique to form the openings 18A, and portions of the upper surface of the insulating film 16 are exposed.

Figure 5F:
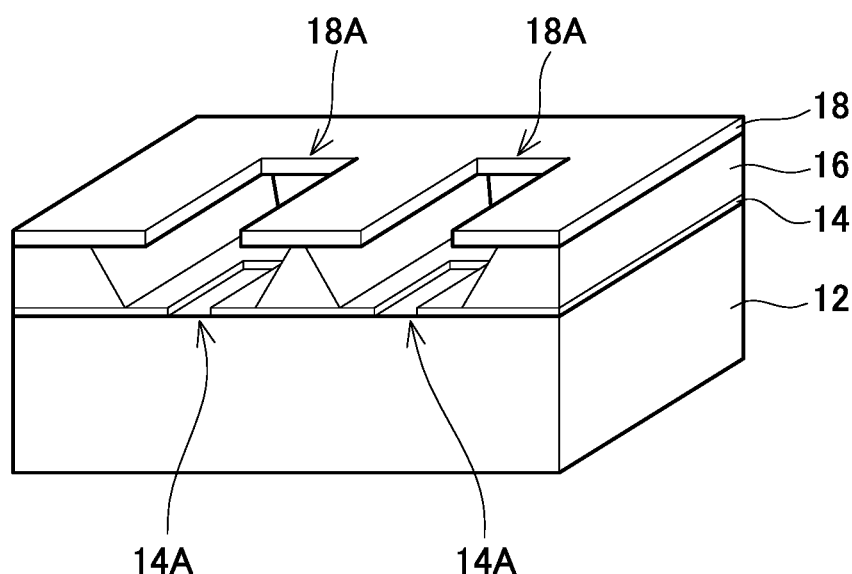
FIG. 5F shows a step of the electron emission device manufacturing process of the first embodiment.

Next, as shown in FIG. 5F, the insulating film 16 exposed inside the openings 18A of the extraction electrode 18 is removed using wet etching technique. Hydrogen fluoride is used as etchant solution. Due to this, portions of the insulating film 16 are removed, and the openings 14A of the electron emission layer 14 and the openings 18A of the extraction electrode 18 are thereby communicated. Finally, the laser beam irradiator 20 is attached, as a result of which the electron emission device 1 is completed.

Second Embodiment

Figure 6:
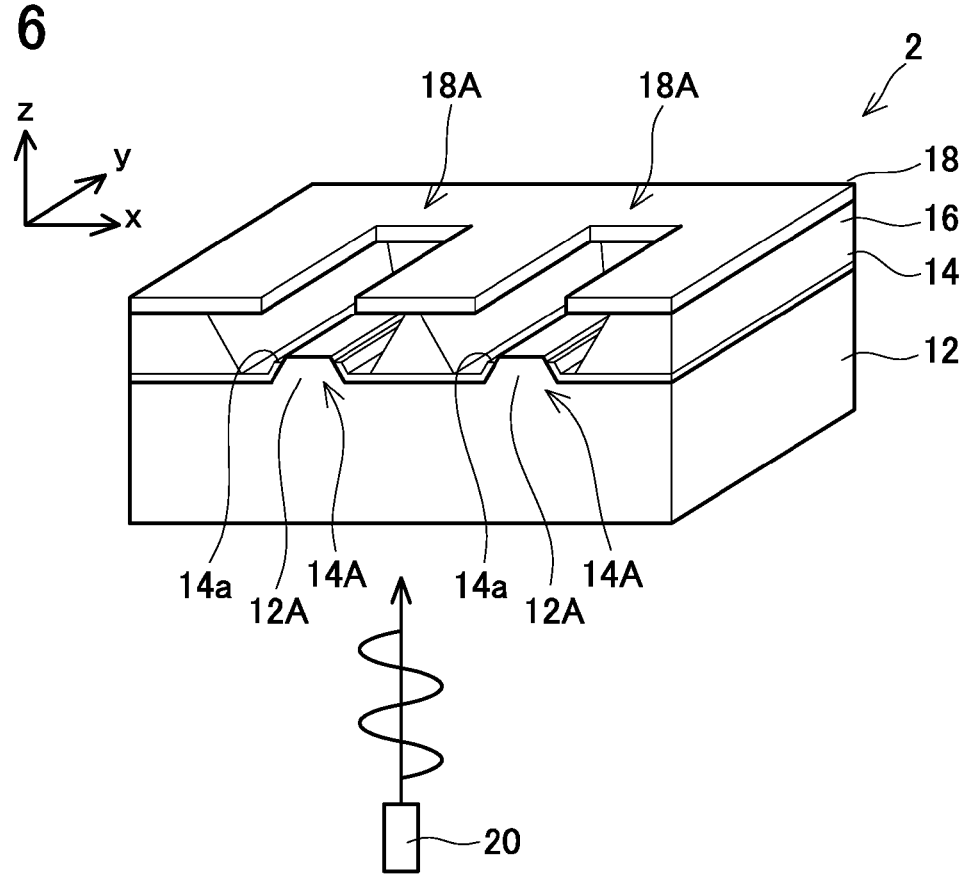
FIG. 6 schematically shows a perspective view of a primary portion of an electron. emission device of a second embodiment.

FIG. 6 shows an electron emission device 2 of a second embodiment Notably, constituent features that are substantially mutual to the electron emission device 1 of FIG. 1 will be given the same reference signs, and the descriptions therefor will be omitted.

In the electron emission device 2, plural convexes 12A having a mesa-like step shape are provided on the upper surface of the substrate 12. Side surfaces of each convex 12A are partially covered by the electron emission layer 14. A top surface of each convex is exposed through the corresponding opening 14A of the electron emission layer 14. Due to this, the edges 14a defining the openings 14A of the electron emission layer 14 are configured so as to protrude toward the extraction electrode 18.

In this electron emission device 2, when a voltage is applied between the electron emission layer 14 and the extraction electrode 18, the electric field intensity at the edges 14a defining the openings 14A of the electron emission layer 14 becomes stronger than that of the electron emission device 1. Due to this, even if the voltage applied between the electron emission layer 14 and the extraction electrode 18 is low, the electron emission device 2 can highly efficiently perform the field electron emission. Since the voltage applied between the electron emission layer 14 and the extraction electrode 18 can be suppressed low, the electron emission device 2 can suppress dielectric breakdown, and high reliability can be achieved.

Figure 7A:
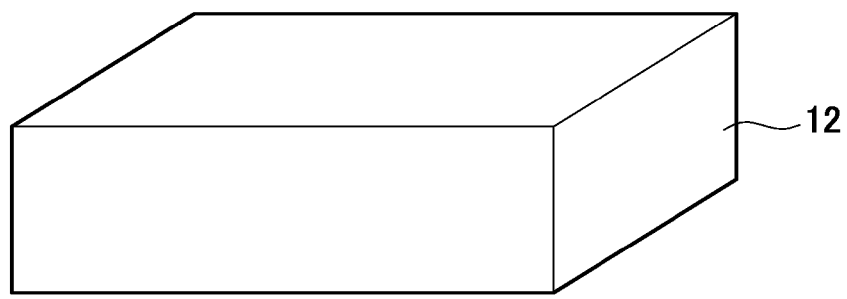
FIG. 7A shows a step of an electron mission device manufacturing process of the second embodiment.

Next, a method of manufacturing the electron emission device 2 will be described with reference to FIGS. 7A to 7L. Firstly, as shown in FIG. 7A, the substrate 12 is prepared.

Figure 7B:
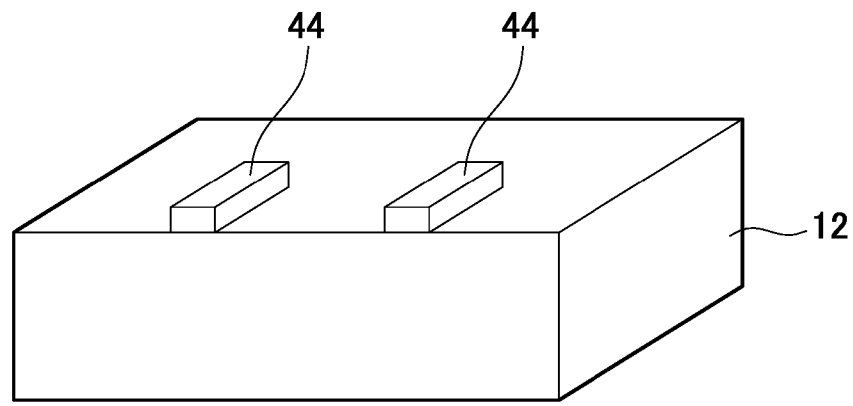
FIG. 7B shows a step of the electron emission device manufacturing process of the second embodiment.

Next, as shown in FIG. 7B, photo masks 44 are patterned on the upper surface of the substrate 12 by using photolithography technique. The photo masks 44 are patterned so that they remain in regions corresponding to positions of the convexes to be formed on the upper surface of the substrate 12.

Figure 7C:
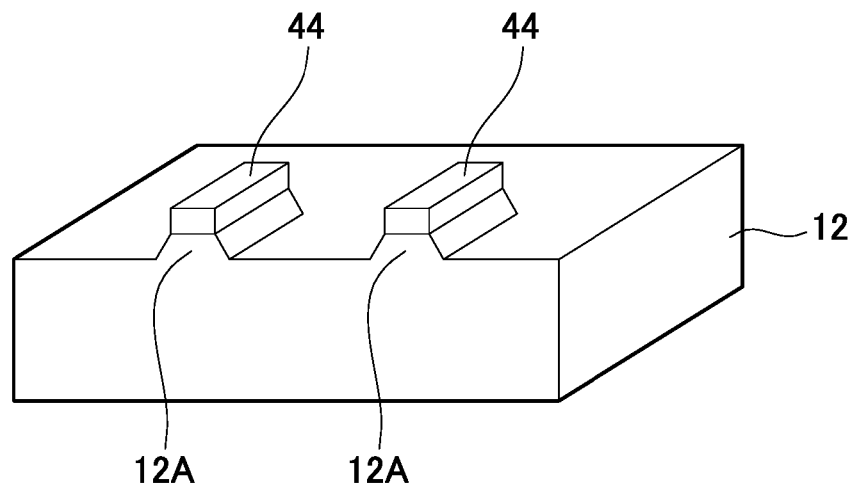
FIG. 7C shows a step of the electron emission device ma manufacturing process of the second embodiment.

Next, as shown in FIG. 7C, the upper surface of the substrate 12 is processed using dry etching technique or wet etching technique to form the convexes 12A having the mesa-like step shape.

Figure 7D:
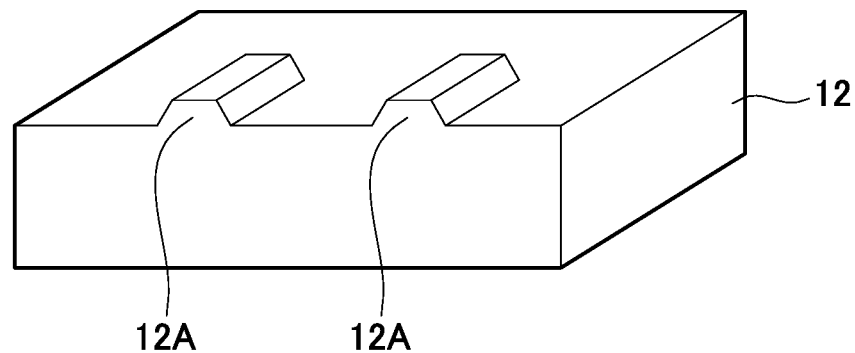
FIG. 7D shows a step of the electron emission device manufacturing process of the second embodiment.

Next, as shown in FIG. 7D, the photo masks 44 are removed.

Figure 7E:
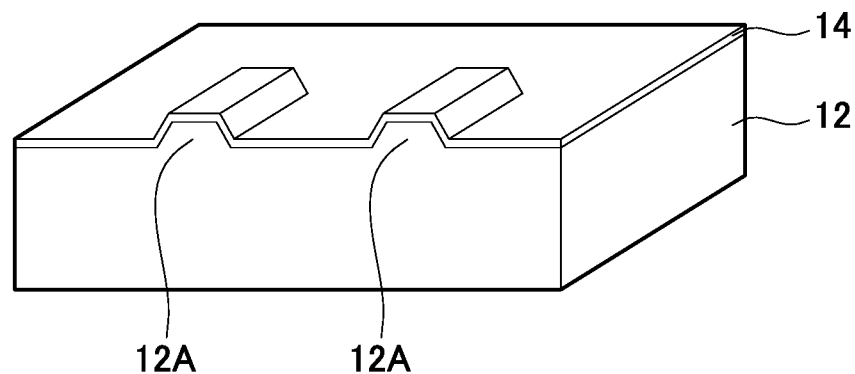
FIG. 7E shows a step of the electron emission device manufacturing process of the second embodiment.

Next, as shown in FIG. 7E, the electron emission layer 14 is deposited on the upper surface of the substrate 12 using vapor deposition technique. The electron emission layer 14 completely covers the upper surface of the substrate 12 including the side surfaces And the top surfaces of the convexes 12A.

Figure 7F:
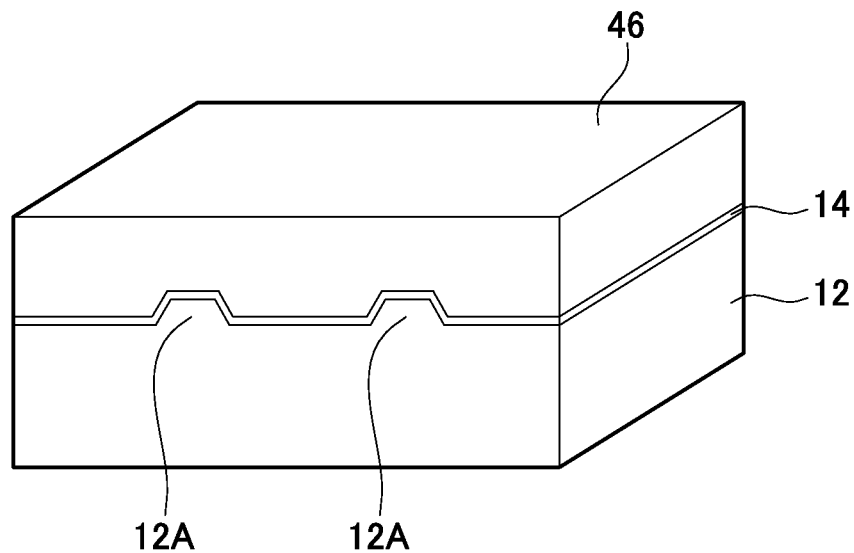
FIG. 7F shows a step of the electron emission device manufacturing process of the second embodiment.

Next, as shown in FIG. 7F, a mask 46 is deposited on the upper surface of the electron emission layer 14 using CVD technique. A material of the mask 46 is for example silicon oxide. Notably, in this deposition step, an upper surface of the mask 46 is preferably flat for an advantage in a subsequent step of etching back. Due to this, the mask 46 to be deposited preferably has a superior flowability and contains phosphorus or boron additives. Alternatively, a heat treatment step for flattening the upper surface of the mask 46 may be carried out after having deposited the mask 46. Alternatively, the upper surface of the mask 46 may be flattened using CMP technique after having deposited the mask 46.

Figure 7G:
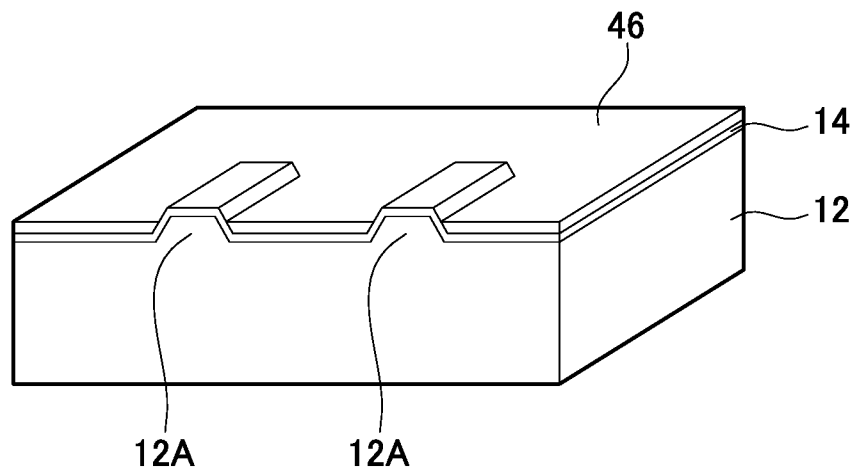
FIG. 7G shows a step of the electron emission device manufacturing process of the second embodiment.

Next, as shown in FIG. 7G, the mask 46 is etched back until the electron emission layer 14 covering the side surfaces of the convexes 12A of the substrate 12 is exposed using dry etching technique or wet etching technique.

Figure 7H:
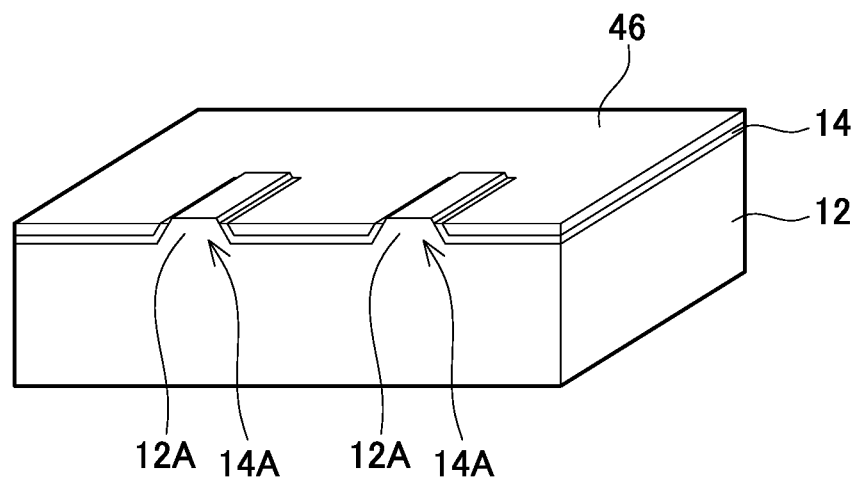
FIG. 7H shows a step of the electron emission device manufacturing process of the second embodiment.

Next, as shown in FIG. 7H, portions of the electron emission layer 14 not covered by the mask 46 are removed using dry etching technique or wet etching technique to form the openings 14A, and portions of the side surfaces and top surfaces of the convexes 12A of the substrate 12 are exposed.

Figure 7I:
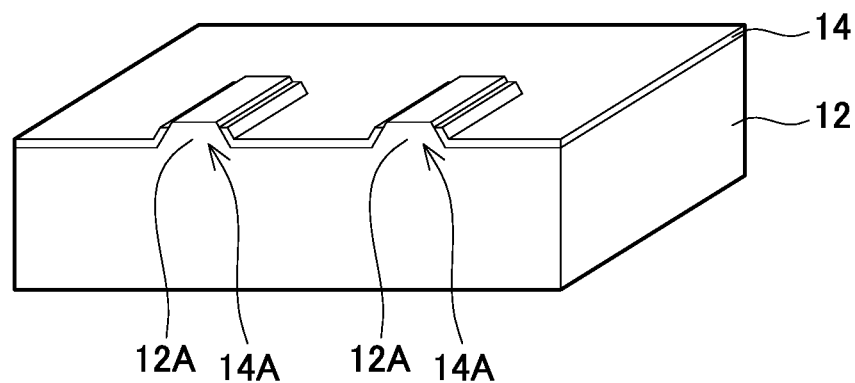
FIG. 7I shows a step of the electron emission device manufacturing process of the second embodiment.

Next, as shown in FIG. 7I, the mask 46 is removed using dry aching technique or wet etching technique.

Figure 7J:
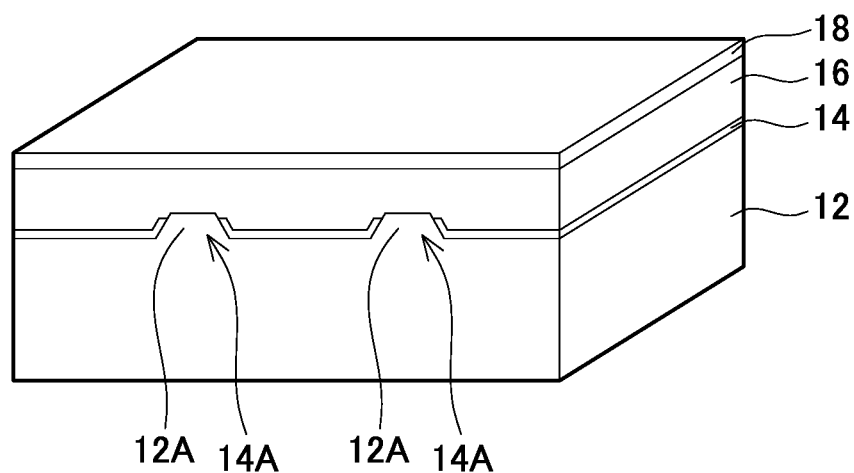
FIG. 7J shows a step of the electron emission device manufacturing process of the second embodiment.

Next, as shown in FIG. 7J, the insulating film 16 is deposited on the upper surface of the electron emission layer 14 using CVD technique. Then, the extraction electrode 18 is deposited on the upper surface of the insulating film 16 using vapor deposition technique.

Figure 7K:
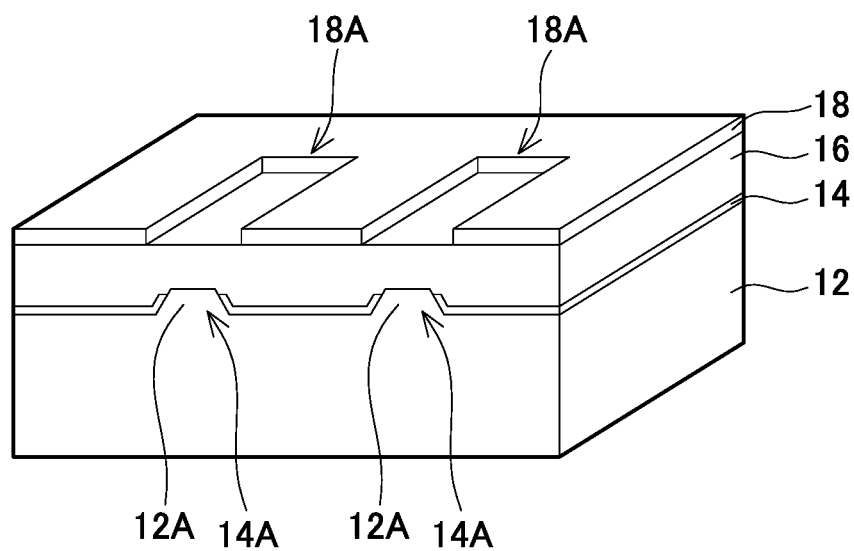
FIG. 7K shows a step of the electron emission device manufacturing process of the second embodiment.

Next, as shown in FIG. 7K, portions of the extraction electrode 18 are removed using photolithography technique and etching technique to form the openings 18A, and portions of the upper surface of the insulating film 16 are exposed.

Figure 7L:
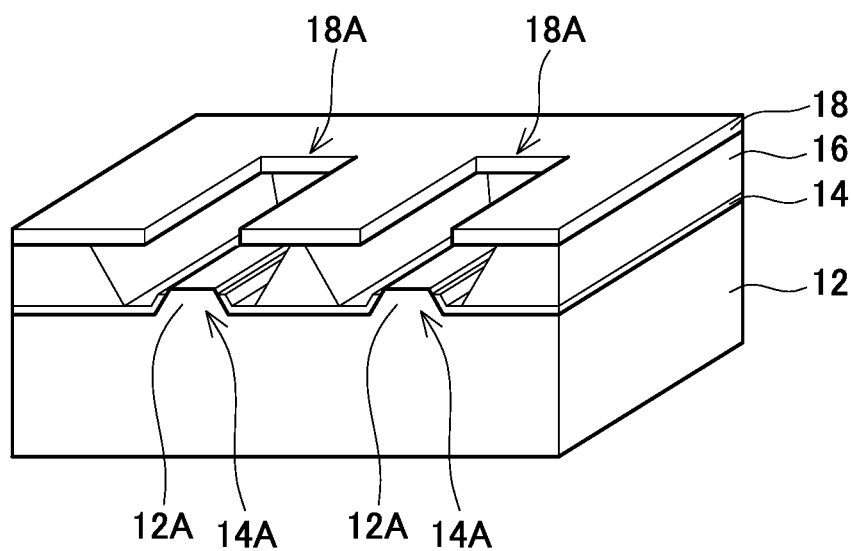
FIG. 7L shows a step of the electron emission device manufacturing process of the second embodiment.

Next, as shown in FIG. 7L, the insulating film 16 exposed inside the openings 18A of the extraction electrode 18 is removed using wet etching technique. Hydrogen fluoride is used as etchant solution. Due to this, portions of the insulating film 16 are removed, and the openings 14A of the electron emission layer 14 and the openings 18A of the extraction electrode 18 are thereby communicated. Finally, the laser beam irradiator 20 is attached, as a result of which the electron emission device 2 is completed.

Third Embodiment

Figure 8:
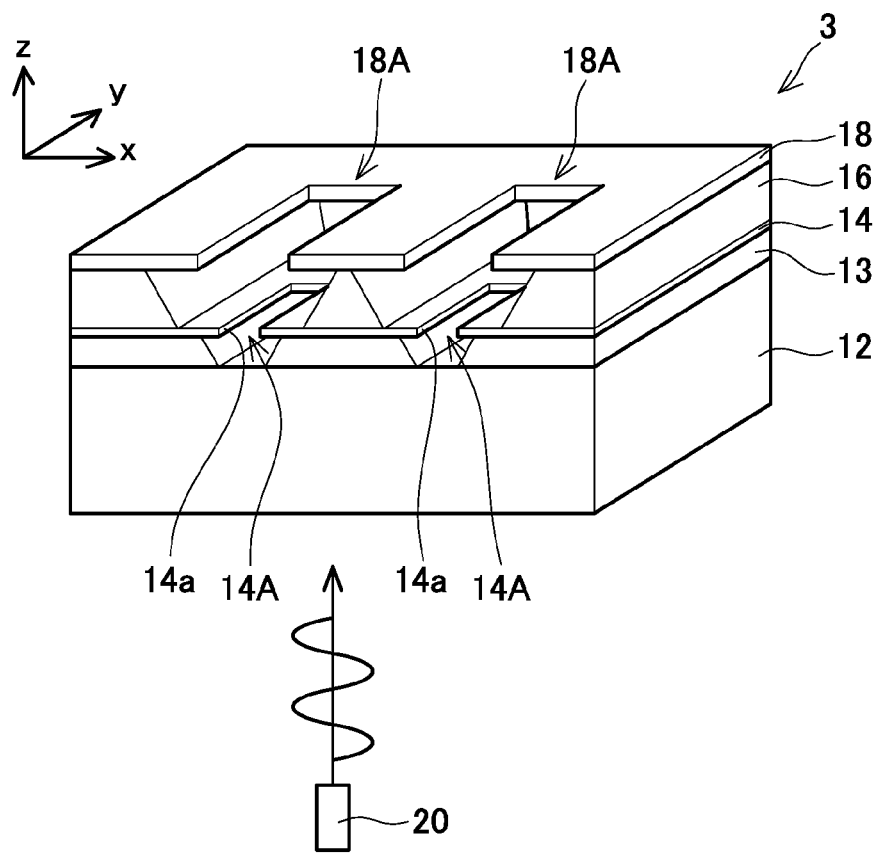
FIG. 8 schematically shows a perspective view of a primary portion of an electron emission device of a third embodiment.

FIG. 8 shows an electron emission device 3 of a third embodiment. Notably, constituent features that are substantially mutual to the electron emission device 1 of FIG. 1 will be given the same reference signs, and the descriptions therefor will be omitted.

The electron emission device 3 comprises a lower insulating film 13 provided between the substrate 12 and the electron emission layer 14. Silicon oxide ($SiO_2$) is used as a material of the lower insulating film 13. The lower insulating film 13 has its lower portions under the openings 14A of the electron emission layer 14 selectively removed. Due to this, the edges 14a defining the openings 14A of the electron emission layer 14 are provided in an eaves-like state in vacuo by protruding out than other members.

For example, in the electron emission device 1 shown in FIG. 1, if an insulator is used as the material of the substrate 12, a screening effect of the substrate 12 (effect by which the equipotential lines do not enter into the substrate 12 from the openings 14A of the electron emission layer 14) weakens the electric field intensity at the edges 14a defining the openings 14A of the electron emission layer 14. On the other hand, in the electron emission device 3 of the present embodiment, the edges 14a defining the openings 14A of the electron emission layer 14 are provided in the eaves-like state in vacuo, it has a structure by which the equipotential lines enter from the openings 14A of the electron emission layer 14 and proceed downward regardless of the material of the substrate 12. As above, the electron emission device 3 has a characteristic that increases freedom of choice regarding the material of the substrate 12.

Figure 9A:
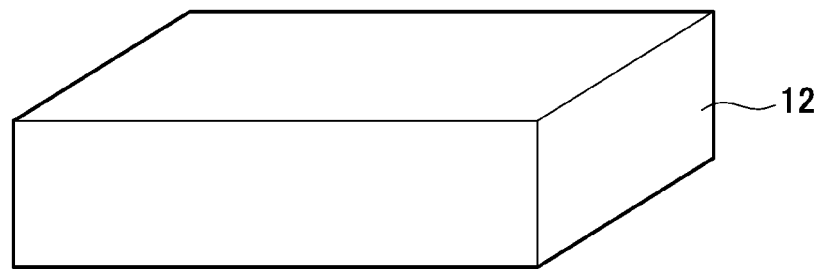
FIG. 9A shows a step of an electron emission device manufacturing process of the third embodiment.

Next, as shown in FIGS. 9A to 9G, a method of manufacturing the electron emission device 3 will be described. Firstly, as shown in FIG. 9A, the substrate 12 is prepared.

Figure 9B:
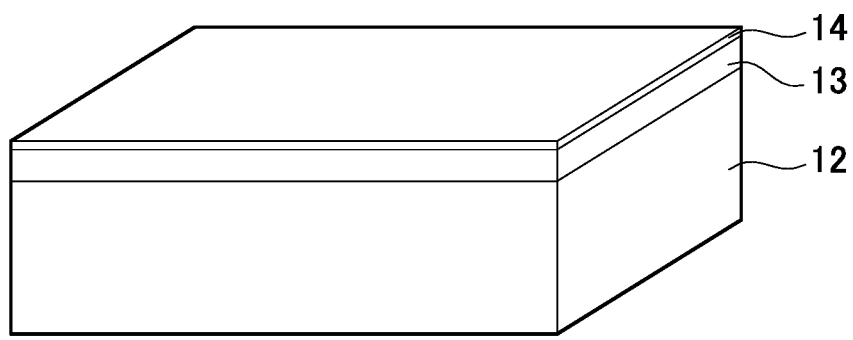
FIG. 9B shows a step of the electron emission device manufacturing process of the third embodiment.

Next, as shown in FIG. 9B, the lower insulating film 13 is deposited on the upper surface of the substrate 12 using CVD technique. Then, the electron emission layer 14 is deposited on an upper surface of the lower insulating film 13 using vapor deposition technique.

Figure 9C:
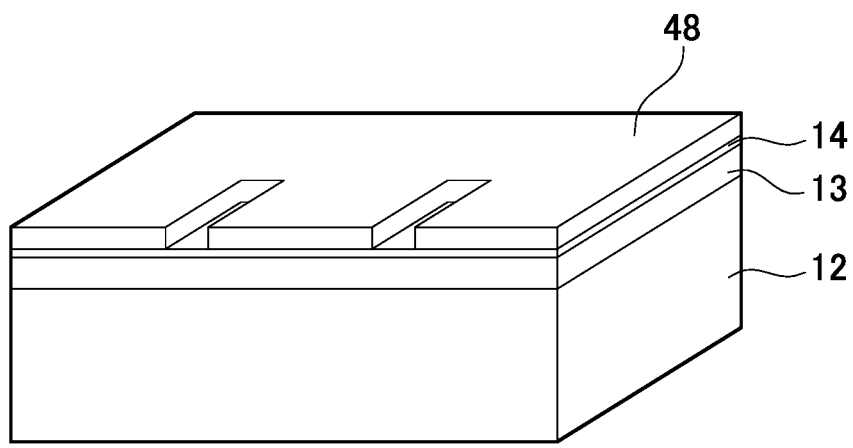
FIG. 9C shows a step of the electron emission device manufacturing process of the third embodiment.

Next, as shown in FIG. 9C, a photo mask 48 is patterned on the upper surface of the electron emission layer 14 by using photolithography technique. The photo mask 48 is patterned so that regions corresponding to positions of openings to be formed on the electron emission layer 14 are removed.

Figure 9D:
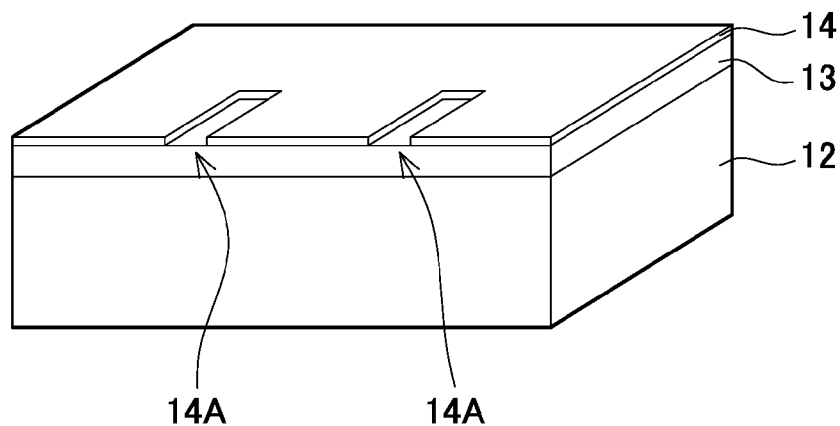
FIG. 9D shows a step of the elect on emission device manufacturing process of the third embodiment.

Next, as shown in FIG. 9D, portions of the electron emission layer 14 exposed in the openings of the photo mask 48 are removed using dry etching technique or wet etching technique to form the openings 14A, and portions of the upper surface of the lower insulating film 13 are exposed. Thereafter, the photo mask 48 is removed.

Figure 9E:
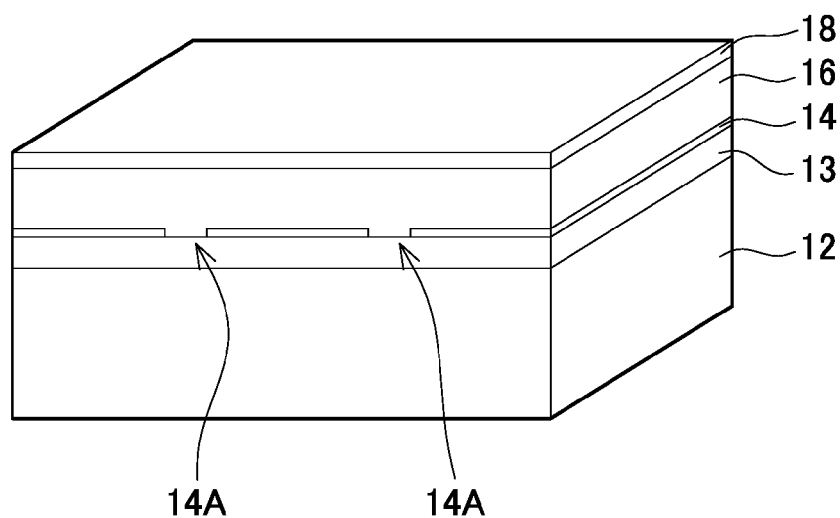
FIG. 9E shows a step of the electron emission device manufacturing process of the third embodiment.

Next, as shown in FIG. 9E, the insulating film 16 is deposited on the upper surface of the electron emission layer 14 using CVD technique. Then, the extraction electrode 18 is deposited on the upper surface of the insulating film 16 using vapor deposition technique.

Figure 9F:
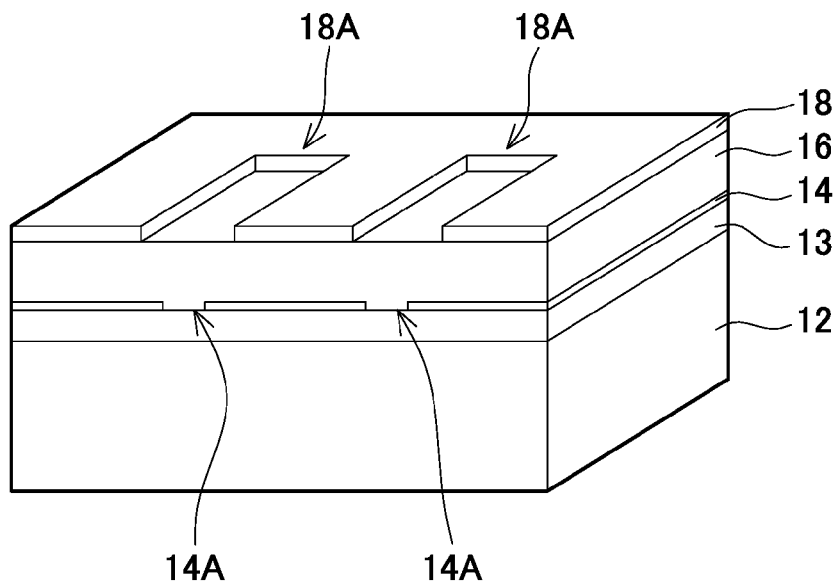
FIG. 9F shows a step of the electron emission device manufacturing process of the third embodiment.

Next, as shown in FIG. 9F, portions of the extraction electrode 18 are removed using photolithography technique and etching technique to form the openings 18A, and portions of the upper surface of the insulating film 16 are exposed.

Figure 9G:
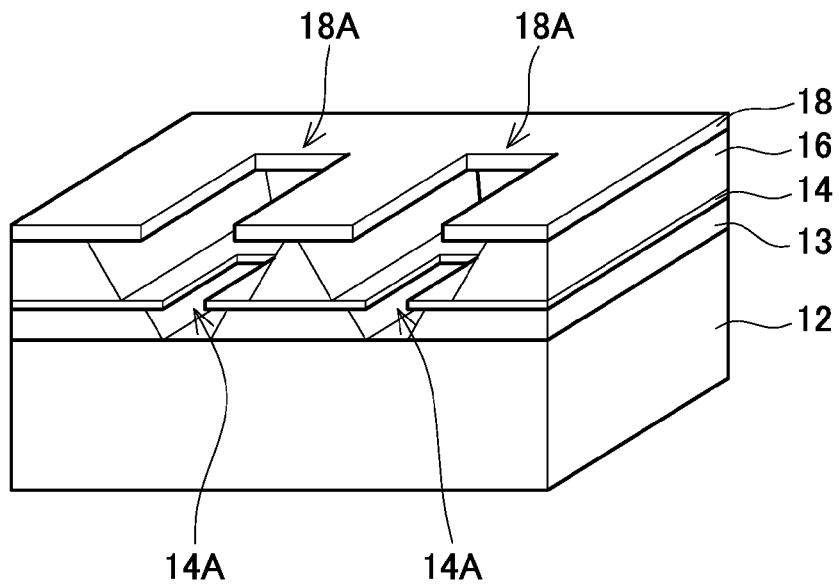
FIG. 9G shows a step of the electron emission device manufacturing process of the third embodiment.

Next, as shown in FIG. 9G, the insulating film 16 exposed inside the openings 18A of the extraction electrode 18 is removed using wet etching technique. Hydrogen fluoride is used as etchant solution. When the portions of the insulating film 16 are removed and the electron emission layer 14 is exposed, the etching progresses towards the lower insulating film 13 exposed inside the openings 14A of the electron emission layer 14 as well. Due to this, the portions of the insulating film 16 are removed and the openings 14A of the electron emission layer 14 and the openings 18A of the extraction electrode 18 are communicated, and also portions of the lower insulating film 13 are removed and the edges 14a defining the openings 14A of the electron emission layer 14 come to protrude out than other members. Finally, the laser beam irradiator 20 is attached, as a result of which the electron emission device 3 is completed.

Fourth Embodiment

Figure 10:
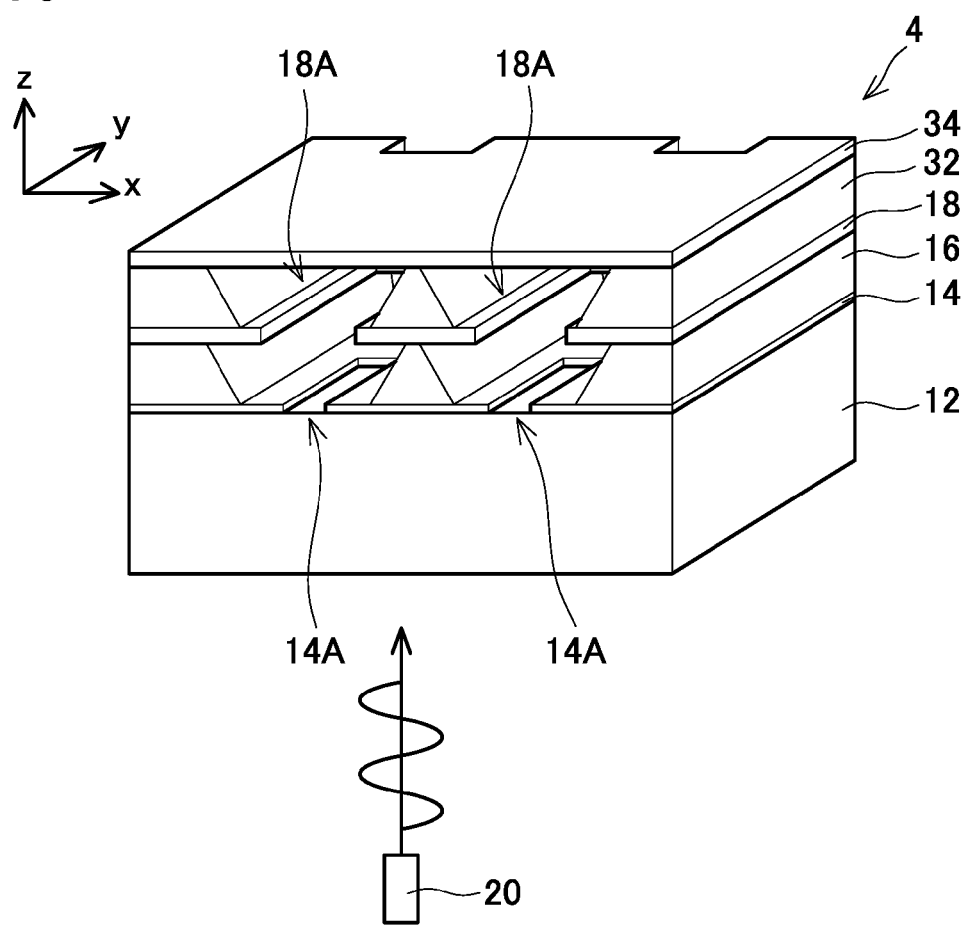
FIG. 10 schematically shows a perspective view of a primary portion of an electron emission device of a fourth embodiment.

FIG. 10 shows a transistor 4 having a triode configuration and provided with an electron emission device. Notably, constituent features that are substantially mutual to the electron emission device 1 of FIG. 1 will be given the same reference signs, and the descriptions therefor will be omitted.

In addition to the electron emission device, the transistor 4 further comprises an upper insulating film 32 and an anode layer 34. In the transistor 4, a space between the electron emission layer 14 (which functions as a cathode layer in the transistor 4) and the anode layer 34 is a vacuum state.

The upper insulating film 32 is provided between the extraction electrode 18 and the anode layer 34, and is in direct contact with each of the extraction electrode 18 and the anode layer 34. The upper insulating film 32 electrically insulates the extraction electrode 18 from the anode layer 34. In this example, silicon oxide ($SiO_2$) is used as a material of the upper insulating film 32.

The anode layer 34 covers an upper surface of the upper insulating film 32, and is in direct contact with the upper surface of the upper insulating film 32. The anode layer 34 communicates with the openings 18A of the extraction electrode 18 through spaces in the upper insulating film 32. The electrons that were emitted from the edges 14a of the electron emission layer 14 flow into the anode layer 34. Due to this, the anode layer 34 is preferably a conductor, and more specifically, metal. In this example, molybdenum is used as a material of the anode layer 34.

Next, an operation of the transistor 4 will be described. Firstly, voltages are applied between the electron emission layer 14 and the extraction electrode 18 as well as between the extraction electrode 18 and the anode layer 34 so that the extraction electrode 18 comes to be at the positive potential relative to the electron emission layer 14 and the anode layer 34 comes to be at the positive potential relative to the extraction electrode 18. In an example, 0V (ground potential) is applied to the electron emission layer 14, +100V is applied to the extraction electrode 18, and +110V is applied to the anode layer 34. The electric field intensity at the edges 14a defining the openings 14A of the electron emission layer 14 becomes high because the extraction electrode 18 is of the positive potential relative to the electron emission layer 14. At this occasion, the voltage applied between the electron emission layer 14 and the extraction electrode 18 is set so that the electric field intensity at the edges 14a of the electron emission layer 14 becomes $10^7$ V/cm or lower.

The transistor 4 controls current flowing from the anode layer 34 to the electron emission layer 14 using the laser beam from the laser beam irradiator 20. When the laser beam from the laser beam irradiator 20 is not irradiated to the electron emission layer 14, the electric field intensity at the edges 14a of the electron emission layer 14 is $10^7$ V/cm or lower as described above, and thus the electrons are not emitted from the electron emission layer 14. On the other hand, when the laser beam from the laser beam irradiator 20 is irradiated to the electron emission layer 14, the optical electric field is superposed on the edges 14a of the electron emission layer 14, and the electric field intensity at the edges 14a of the electron emission layer 14 becomes high. Furthermore, Plasmon resonance is generated at the edges 14a of the electron emission layer 14, and the electric field intensity at the edges 14a of the electron emission layer 14 becomes high. When the laser beam from the laser beam irradiator 20 is irradiated to the electron emission layer 14, the electric field intensity at the edges 14a of the electron emission layer 14 rises to a value that is sufficient for field electron emission by the aforementioned phenomena. As a result, the electrons existing in the electron emission layer 14 pass through the vacuum barrier by the quantum-mechanical tunnel effect, and are emitted in vacuo from the edges 14a of the electron emission layer 14. The electrons emitted from the electron emission layer 14 pass through the openings 18A of the extraction electrode 18, and flow into the anode layer 34. Due to this, the current flows from the anode layer 34 toward the electron emission layer 14.

As described above, the transistor 4 operates to flow the current by emitting the electrons from the edges 14*a* of the electron emission layer 14 when the laser beam from the laser beam irradiator 20 is irradiated to the electron emission layer 14, and to stop the current by stopping the electron emission from the edges 14*a* of the electron emission layer 14 when the laser beam from the laser beam irradiator 20 is not irradiated to the electron emission layer 14. The transistor 4 can control to switch on and off the current flowing from the anode layer 34 to the electron emission layer 14 by using the laser beam from the laser beam irradiator 20. As above, since the transistor 4 can control the current using the laser beam from the laser beam irradiator 20, it has characteristics of being robust to electric noise and capable of operating at fast speed. Further, the only voltages applied to the transistor 4 are in between the electron emission layer 14 and the extraction electrode 18 and between the extraction electrode 18 and the anode layer 34, where insulation is ensured by the insulating film 16 and the upper insulating film 32. The transistor 4 can ensure insulation with a simple configuration, thus it also has a characteristic of high reliability.

Further, the transistor 4 maintains the spaces between the electron emission layer 14 and the anode layer 34 in the vacuum state. Due to this, the electrons emitted from the edges 14*a* of the electron emission layer 14 are subject to ballistic conduction from the electron emission layer 14 to the anode layer 34. Thus, in the transistor 4, there is no trade-off relationship between ON-resistance and voltage resistance dependent on impurity concentrations, such as in a transistor in which the electrons are subject to conduction through semiconductors. The transistor 4 can achieve both of extremely low ON-resistance and extremely high voltage resistance. Further, in a transistor using semiconductors, development of high quality semiconductor substrate with the least possible crystal defects is mandatory. However, the transistor 4 using the vacuum state is free from such burden of material development. Furthermore, the transistor 4 has a characteristic that its operation is stable even under a high temperature state.

Figure 11:
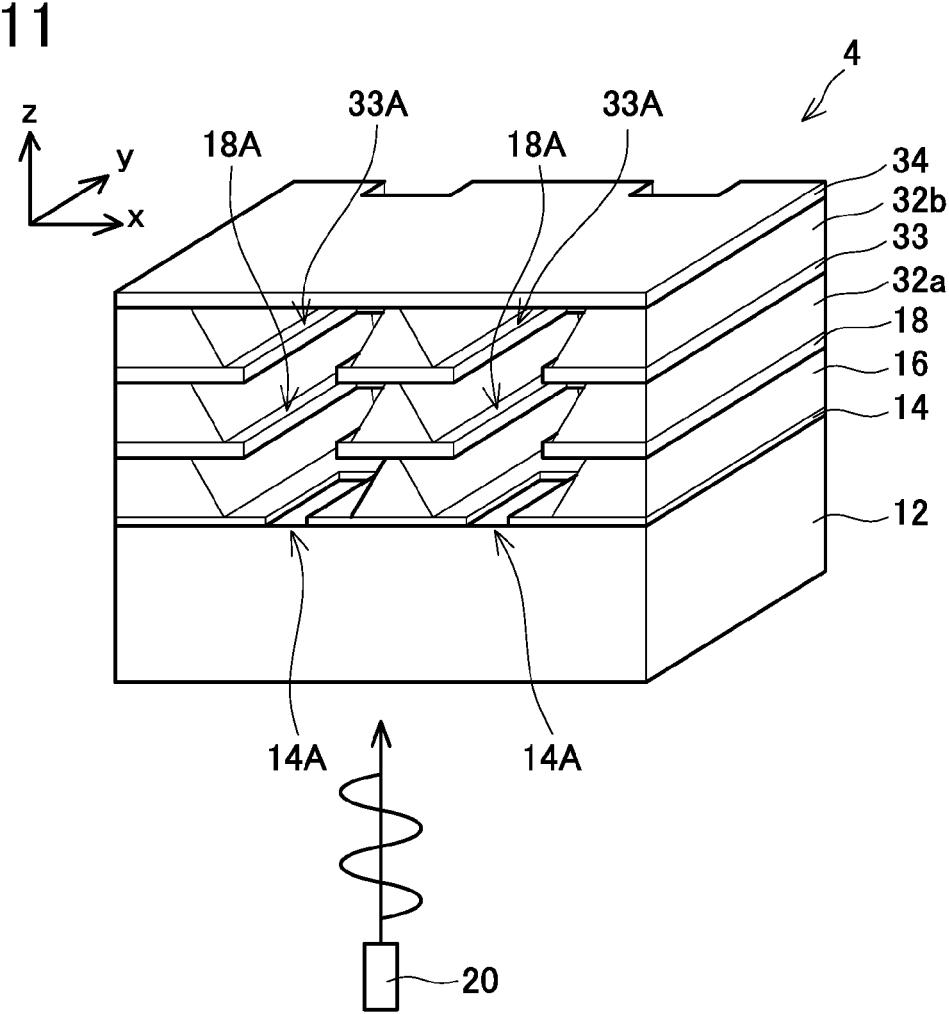
FIG. 11 schematically shows a plan view of a primary portion of an electron emission device of a variant of the fourth embodiment.

The transistor 4 having the triode configuration operates under a mode similar to a static induction type transistor (SIT) in which the current does not saturate. If it should be operated in a mode similar to a field effect transistor (FET), as shown in FIG. 11, a transistor 5 having a tetrode configuration in which a shielding electrode (screen grid) 33 is inserted between the extraction electrode 18 and the anode layer 34 may be employed. The shielding electrode 33 is electrically insulated from the extraction electrode 18 by a first upper insulating film 32*a*, and is electrically insulated from the anode layer 34 by a second upper insulating film 32*b*. Plural openings 33A are provided in the shielding electrode 33. Each of the openings 33A of the shielding electrode 33 is provided along the z-axis line to align with its corresponding one of the plural openings 18A of the extraction electrode 18. The openings 33A of the shielding electrode 33 and the openings 18A of the extraction electrode 18 are arranged to communicate through spaces provided in the first upper insulating film 32*a*. The openings 33A of the shielding electrode 33 and the anode layer 34 are arranged so as to communicate through spaces provided in the second upper insulating film 32*b*.

In the transistor 5, for example, 0V (ground potential) is applied to the electron emission layer 14, +100V is applied to the extraction electrode 18, 0V (ground potential) is applied to the Shielding electrode 33, and +2 to 3V is applied to the anode layer 34. Under such a condition, the transistor 5 can control the current flowing from the anode layer 34 to the electron emission layer 14 to switch on and off using the laser beam from the laser beam irradiator 20, and its operation mode is an operation mode similar to that of the field effect transistor (FET).

Figure 12A:
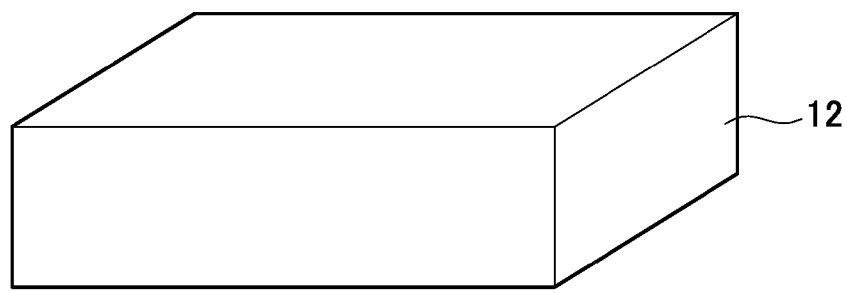
FIG. 12A shows a step of an electron emission device manufacturing process of the fourth embodiment.

Next, as shown in FIGS. 12A to 12H, a manufacturing method of the transistor 4 will be described. Firstly, as shown in FIG. 12A, the substrate 12 is prepared.

Figure 12B:
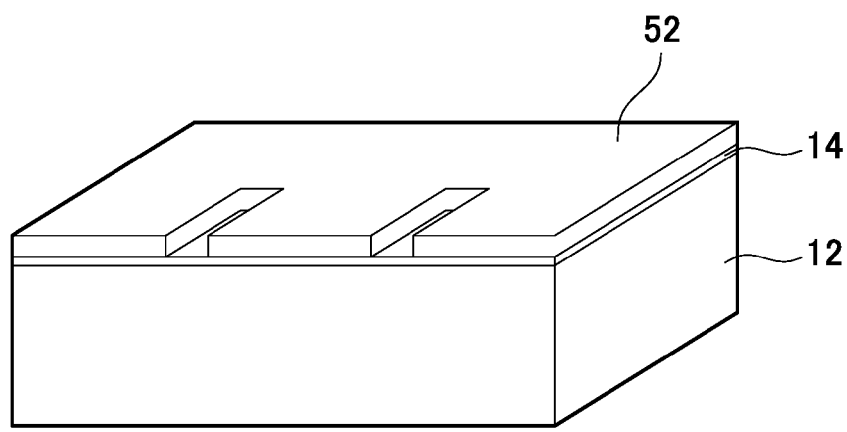
FIG. 12B shows a step of the electron emission device manufacturing process of the fourth embodiment.

Next, as shown in FIG. 12B, the electron emission layer 14 is deposited on the upper surface of the substrate 12 using vapor deposition technique. Then, a photo mask 52 is patterned on the upper surface of the electron emission layer 14 by using photolithography technique. The photo mask 52 is patterned so that regions corresponding to positions of openings to be formed on the electron emission layer 14 are removed.

Figure 12C:
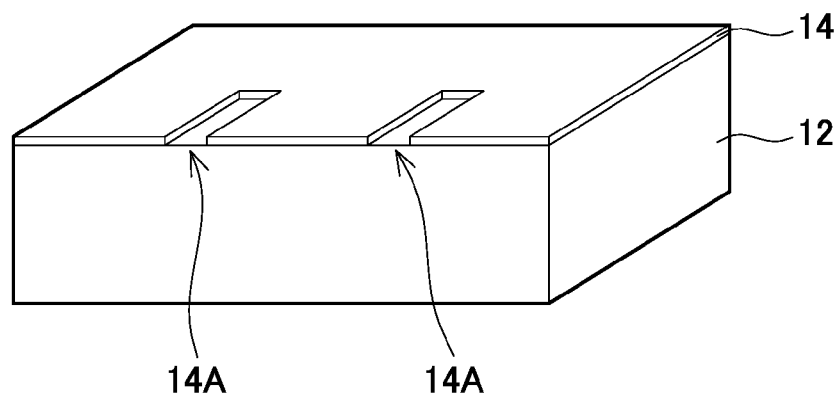
FIG. 12C shows a step of the electron emission device manufacturing process of the fourth embodiment.

Next, as shown in FIG. 12C, portions of the electron emission layer 14 exposed in the openings of the photo mask 52 are removed using dry etching technique or wet etching technique to form the openings 14A, and portions of the upper surface of the substrate 12 are exposed. Thereafter, the photo mask 52 is removed.

Figure 12D:
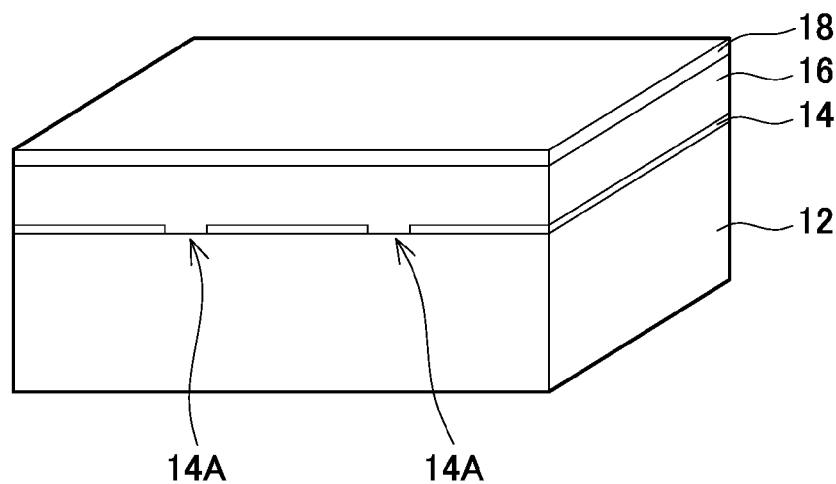
FIG. 12D shows a step of the electron emission device manufacturing process of the fourth embodiment.

Next, as shown in FIG. 12D, the insulating film 16 is deposited on the upper surface of the electron emission layer 14 using CVD technique. Then, the extraction electrode 18 is deposited on the upper surface of the insulating film 16 using vapor deposition technique.

Figure 12E:
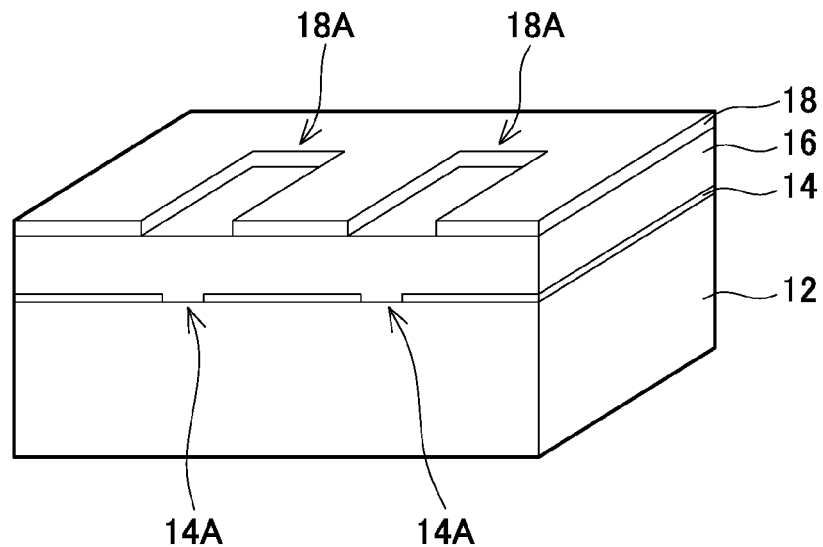
FIG. 12E shows a step of the electron emission device manufacturing process of the fourth embodiment.

Next, as shown in FIG. 12E, portions of the extraction electrode 18 are removed using photolithography technique and etching technique to form the openings 18A, and portions of the upper surface of the insulating film 16 are exposed.

Figure 12F:
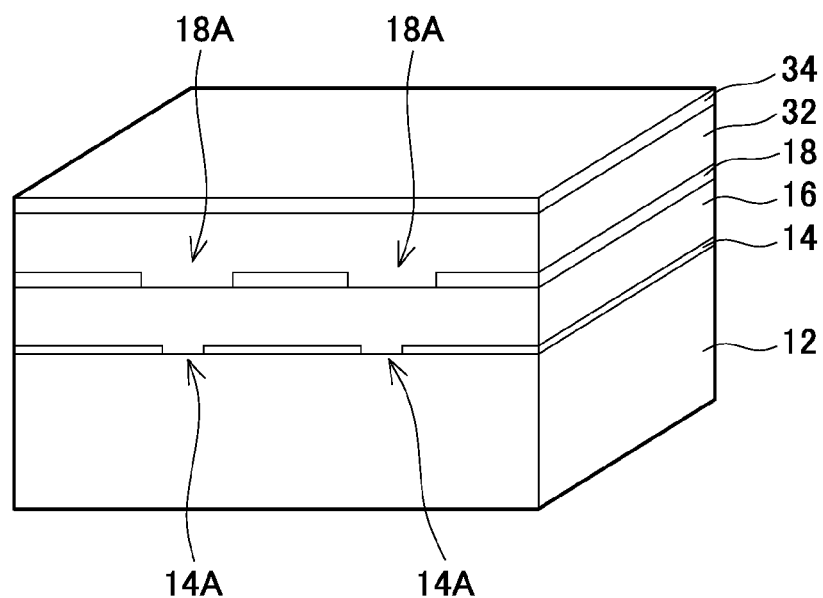
FIG. 12F shows a step of the electron emission device manufacturing process of the fourth embodiment.

Next, as shown in FIG. 12F, the upper insulating film 3 is deposited on the upper surface of the extraction electrode 18 using CVD technique. Then, the anode layer 34 is deposited on the upper surface of the upper insulating film 32 using vapor deposition technique.

Figure 12G:
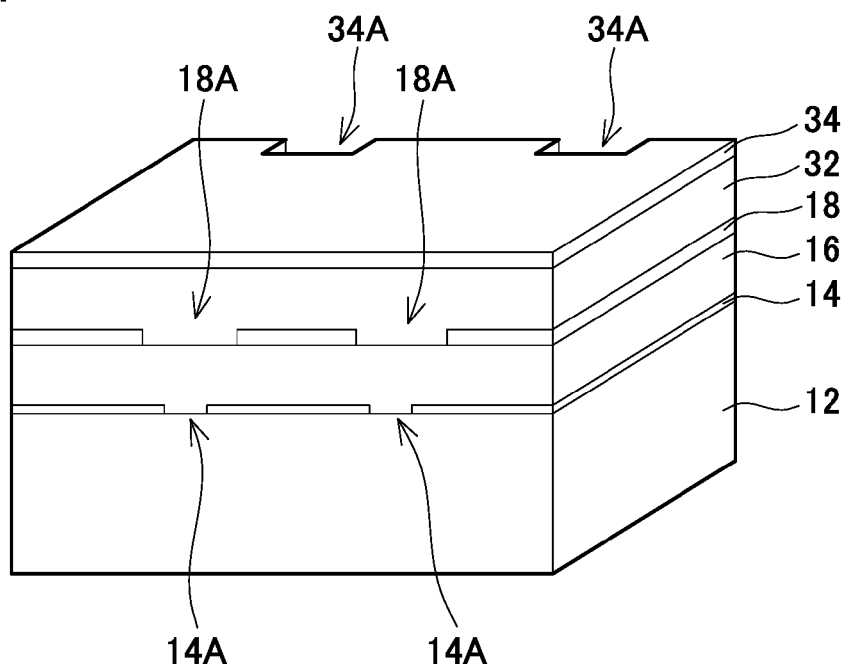
FIG. 12G shows a step of the electron emission device manufacturing process of the fourth embodiment.

Next, as shown in FIG. 12G, portions of the anode layer 34 are removed using photolithography technique and etching technique to form the openings 34A, and portions of the upper surface of the upper insulating film 32 are exposed. The openings 34A of the anode layer 34 are preferably formed at a constant cycle along the longitudinal direction (y-axis direction of FIG. 10) of the openings 18A of the extraction electrode 18. More preferably, the openings 34A of the anode layer 34 are formed along the longitudinal direction of the openings 18A of the extraction electrode 18 at a cycle that is twice or three times the opening width (width in the x-axis direction of FIG. 10) of the openings 18A of the extraction electrode 18.

Figure 12H:
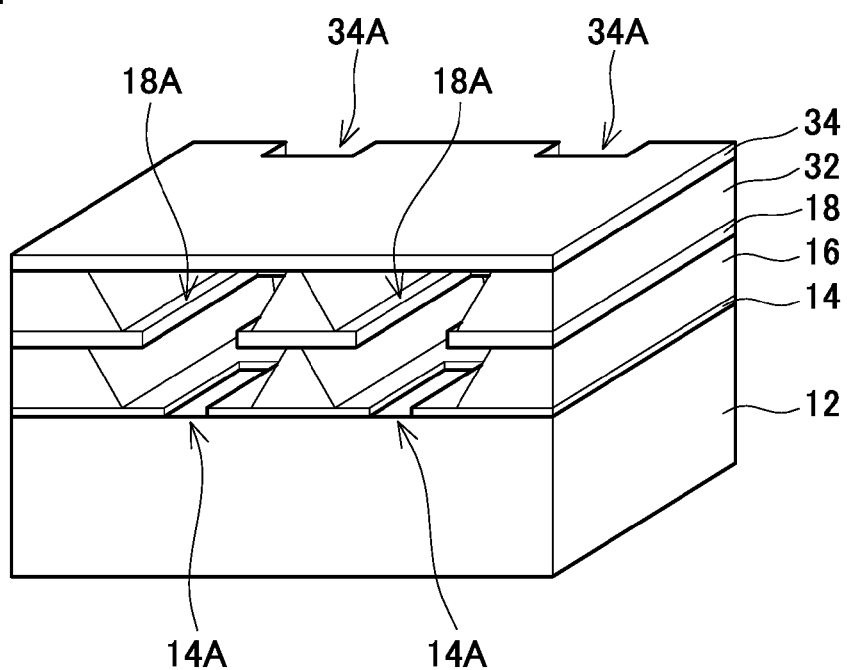
FIG. 12H shows a step of the electron emission device manufacturing process of the fourth embodiment.

Next, as shown in FIG. 12H, portions of the upper insulating film 32 exposed in the openings 34A of the anode layer 34 are removed using wet etching technique. Hydrogen fluoride is used as etchant solution. When the portions of the upper insulating film 32 are removed and the extraction electrode 18 is exposed, the etching progresses towards the insulating film 16 exposed inside the openings 18A of the extraction electrode 18 as well. Due to this, portions of the upper insulating film 32 are removed and the openings 18A of the extraction electrode 18 and the anode layer 34 are communicated, and also portions of the insulating film 16 are removed and the openings 14A of the electron emission layer 14 and the openings 18A of the extraction electrode 18 are communicated. Notably, a shape of spaces formed in the upper insulating film 32 and the insulating film 16 depends on how densely the openings 34A of the anode layer 34 are provided. Due to this, the openings 34A of the anode layer 34 are preferably provided in the aforementioned configurations. Finally, the laser beam irradiator 20 is attached, as a result of which the transistor 4 is completed.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. An electron emission device comprising:
    a substrate; and
    an electron emission layer disposed above the substrate, wherein an opening is arranged in the electron emission layer,
    wherein the electron emission layer has an edge defining the opening and is configured to emit electrons from the edge when the edge is irradiated with light.

2. The electron emission device according to claim 1, further comprising:
    a light irradiator configured to irradiate light toward the electron emission layer.

3. The electron emission device according to claim 2, wherein
    the opening of the electron emission layer includes a shape extending in a longitudinal direction when seen along a direction orthogonal to an upper surface of the substrate, and
    the light irradiator is configured to irradiate a laser beam of linearly polarized light of which oscillation plane of electric field is orthogonal to the longitudinal direction.

4. The electron emission device according to claim 2, wherein
    a material of the substrate is transparent to the light of the light irradiator, and
    the light irradiator is configured to irradiate the light toward the electron emission layer through the substrate.

5. The electron emission device according to claim 1, further comprising:
    an extraction electrode disposed above the electron emission layer, wherein an opening is arranged in the extraction electrode,
    wherein the opening of the extraction electrode is located above the opening of the electron emission layer.

6. The electron emission device according to claim 5, wherein
    the edge defining the opening of the electron emission layer is within the opening of the extraction electrode when seen along the direction orthogonal to the upper surface of the substrate.

7. The electron emission device according to claim 5, wherein
    a convex is arranged on the upper surface of the substrate,
    a part of a side surface of the convex is covered with the electron emission layer, and
    a top surface of the convex is exposed through the opening of the electron emission layer.

8. A transistor comprising:
    a substrate;
    a cathode layer disposed above the substrate, wherein an opening is arranged in the cathode layer; and
    an anode layer disposed above the cathode layer,
    wherein the cathode layer has an edge defining the opening and is configured to emit electrons from the edge when the edge is irradiated with light.

9. The transistor according to claim 8, further comprising:
    a light irradiator configured to irradiate light toward the cathode layer.

10. The transistor according to claim 9, wherein
    the opening of the cathode layer has a shape extending along a longitudinal direction when seen along a direction orthogonal to an upper surface of the substrate, and
    the light irradiator is configured to irradiate a laser beam of linearly polarized light of which oscillation plane of electric field is orthogonal to the longitudinal direction.

11. The transistor according to claim 9, wherein
    a material of the substrate is transparent to the light of the light irradiator, and
    the light irradiator is configured to irradiate the light toward the cathode layer through the substrate.

12. The transistor according to claim 8, further comprising:
    an extraction electrode disposed between the cathode layer and the anode layer, wherein an opening is arranged in the extraction electrode,
    wherein the opening of the extraction electrode is located above the opening of the cathode layer.

13. The transistor according to claim 12, wherein
    the edge defining the opening of the cathode layer is within the opening of the extraction electrode when seen along the direction orthogonal to the upper surface of the substrate.

14. The transistor according to claim 12, wherein
    convex is arranged on the upper surface of the substrate,
    a part of a side surface of the convex is covered with the cathode layer, and
    a top surface of the convex is exposed through the opening of the cathode layer.

15. A transistor comprising:
    the electron emission device according to claim 1; and
    an anode layer disposed above the electron emission layer.

* * * * *